(12) United States Patent
Yan

(10) Patent No.: US 12,206,542 B2
(45) Date of Patent: Jan. 21, 2025

(54) SIGNAL TRANSMISSION METHOD AND APPARATUS

(71) Applicant: HUAWEI TECHNOLOGIES CO., LTD., Guangdong (CN)

(72) Inventor: Mao Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 18/300,375

(22) Filed: Apr. 13, 2023

(65) Prior Publication Data

US 2023/0261921 A1 Aug. 17, 2023

Related U.S. Application Data

(63) Continuation of application No. PCT/CN2020/121267, filed on Oct. 15, 2020.

(51) Int. Cl.
H04L 27/26 (2006.01)

(52) U.S. Cl.
CPC ...... *H04L 27/2636* (2013.01); *H04L 27/2605* (2013.01)

(58) Field of Classification Search
CPC .......... H04L 27/2636; H04L 27/2605
USPC .......................................... 375/260
See application file for complete search history.

(56) References Cited

U.S. PATENT DOCUMENTS

| 2011/0142001 | A1  | 6/2011 | Ko et al. |
| 2013/0170524 | A1  | 7/2013 | Hasegawa |
| 2016/0021663 | A1* | 1/2016 | Takahashi ............ H04L 1/0041 370/329 |
| 2019/0268202 | A1* | 8/2019 | Levinbook .......... H04L 27/2614 |

FOREIGN PATENT DOCUMENTS

| CN | 101494629 A | 7/2009 |
| CN | 101541070 A | 9/2009 |
| CN | 102835048 A | 12/2012 |
| CN | 109150480 A | 1/2019 |
| CN | 110603790 A | 12/2019 |
| WO | 2010062230 A1 | 6/2010 |

OTHER PUBLICATIONS

3GPP TS 38.211 V16.3.0 (Sep. 2020), 3rd Generation Partnership Project; Technical Specification Group Radio Access Network; NR; Physical channels and modulation(Release 16), 24 pages.
3GPP TS 36.211 V16.3.0:"3rd Generation Partnership Project;Technical Specification Group Radio Access Network; Evolved Universal Terrestrial Radio Access (E-UTRA);Physical channels and modulation(Release 16)",Sep. 2020,total 249 pages.

* cited by examiner

Primary Examiner — Kevin M Burd

(57) ABSTRACT

A signal transmission method and an apparatus are provided, to resolve a problem, in a conventional technology, that transmission performance is poor when a signal is transmitted in a DFT-s-OFDM waveform. A transmitting end maps a plurality of modulation symbols to a plurality of layers, performs discrete Fourier transform (DFT) on a modulation symbol at a part of the layers to obtain a first symbol, and performs discrete Fourier transform DFT and phase offset on a modulation symbol at a remaining part of the layers to obtain a second symbol. Phase offset is performed on a symbol at a part of layers, so that a PAPR can be reduced.

20 Claims, 9 Drawing Sheets

SIGNAL TRANSMISSION METHOD AND APPARATUS

CROSS-REFERENCE TO RELATED APPLICATIONS

This application is a continuation of International Application No. PCT/CN2020/121267, filed on Oct. 15, 2020, the disclosure of which is hereby incorporated by reference in its entirety.

TECHNICAL FIELD

This application relates to the field of wireless communication technologies, and in particular, to a signal transmission method and an apparatus.

BACKGROUND

When transmitting an uplink signal to a network device, a terminal may transmit the uplink signal in an orthogonal frequency division multiplexing (OFDM) waveform or a discrete Fourier transform-spread-OFDM (DFT-s-OFDM) waveform. In a current new radio (NR) communication system, as specified, a terminal may perform multi-layer transmission when transmitting an uplink signal in an OFDM waveform, and can only perform single-layer transmission when transmitting an uplink signal in a DFT-s-OFDM waveform.

A degree of freedom of a multiple-input multiple-output (MIMO) channel cannot be fully utilized for the single-layer transmission. Consequently, transmission performance and transmission efficiency are low. Based on this, when the uplink signal is transmitted in the DFT-s-OFDM waveform, how to improve transmission performance is a technical problem to be resolved.

SUMMARY

This application provides a signal transmission method and an apparatus, to resolve a problem, in a conventional technology, that transmission performance is poor when a signal is transmitted in a discrete Fourier transform-spread-orthogonal frequency division multiplexing (DFT-s-OFDM) waveform.

According to a first aspect, a signal transmission method is provided. A transmitting end maps a plurality of modulation symbols to a plurality of layers; and the transmitting end performs discrete Fourier transform (DFT) on a modulation symbol at a part of the layers to obtain a first symbol, and performs DFT and phase offset on a modulation symbol at a remaining part of the layers to obtain a second symbol. Then, the transmitting end separately performs first processing on the first symbol and the second symbol to obtain a DFT-s-OFDM signal, and transmits the DFT-s-OFDM signal.

In the first aspect, a peak to average power ratio (PAPR) may be reduced by performing phase offset on a symbol at the part of the layers (the layers may be replaced with antenna ports, streams, or groups).

In a possible implementation, the first processing includes one or more of the following: frequency domain resource mapping, inverse fast Fourier transform (IFFT), or precoding.

In a possible implementation, a phase shifted by the phase offset is related to a first parameter; and the first parameter includes one or more of the following: a layer index, an antenna port index, a stream index, a symbol index, a subcarrier index, a size of the DFT, a quantity of modulation symbols, a total quantity of layers, a total quantity of antenna ports, a total quantity of streams, a modulation order, or a quantity of modulation constellation symbols. There are a plurality of first parameters, so that transmission performance may be improved, and a shifted phase may be flexibly determined.

In a possible implementation, a phase shifted by the phase offset includes a first phase and/or a second phase; and the first phase is:

$$e^{-i2\pi \frac{(m-j)}{RM} \times n},$$

where
$i=\sqrt{-1}$, j is an integer greater than or equal to 0, R is a size of the DFT or a quantity of modulation symbols, n is a symbol index or a subcarrier index, m is a layer index, an antenna port index, or a stream index, and M is an integer greater than or equal to 2;
the first phase is:

$$e^{-i2\pi\left(\frac{(m-j)}{RM}+d\right) \times n},$$

where
$i=\sqrt{-1}$, j is an integer greater than or equal to 0, R is a size of the DFT or a quantity of modulation symbols, n is a symbol index or a subcarrier index, m is a layer index, an antenna port index, or a stream index, M is an integer greater than or equal to 2, and d is greater than 0; or
the second phase is:

$$e^{-i2\pi \frac{(m-j)}{MQ}},$$

where
$i=\sqrt{-1}$, j is an integer greater than or equal to 0, m is a layer index, an antenna port index, or a stream index, M is an integer greater than or equal to 2, and Q is greater than 0.

In a possible implementation, a minimum value of j is the same as a minimum value of m.

In a possible implementation, M is a total quantity of layers, a total quantity of antenna ports, or a total quantity of streams.

In a possible implementation, d=k/R, and k is an integer greater than or equal to 0.

In a possible implementation, Q is related to a modulation order.

In a possible implementation, when the shifted phase is the first phase:

$$e^{-i2\pi \frac{m}{RM} \times n},$$

the second symbol is:

$$y_m(n) = \frac{1}{\sqrt{R}} \times e^{-i2\pi \frac{m}{RM} \times n} \times \sum_{r=0}^{R-1} x_{m,r} e^{-\frac{i2\pi}{R} \times rn};$$

or
when the shifted phase is the first phase:

$$e^{-i2\pi\left(\frac{m}{RM}+\frac{k}{R}\right)\times n},$$

the second symbol is:

$$y_m(n) = \frac{1}{\sqrt{R}} \times e^{-i2\pi\left(\frac{m}{RM}+\frac{k}{R}\right)\times n} \times \sum_{r=0}^{R-1} x_{m,r} e^{-\frac{i2\pi}{R}\times rn};$$

or
when the shifted phase is the second phase:

$$e^{-i2\pi\frac{m}{MQ}},$$

the second symbol is:

$$y_m(n) = \frac{1}{\sqrt{R}} \times e^{-i2\pi\frac{m}{MQ}} \times \sum_{r=0}^{R-1} x_{m,r} e^{-\frac{i2\pi}{R}\times rn};$$

or
when the shifted phase includes the first phase:

$$e^{-i2\pi\frac{m}{RM}\times n}$$

and the second phase:

$$e^{-i2\pi\frac{m}{MQ}},$$

the second symbol is:

$$y_m(n) = \frac{1}{\sqrt{R}} \times e^{-i2\pi\frac{m}{RM}\times n} \times e^{-i2\pi\frac{m}{MQ}} \times \sum_{r=0}^{R-1} x_{m,r} e^{-\frac{i2\pi}{R}\times rn}.$$

In the foregoing several examples, m=0, 1, 2, . . . , and M−1; and r=0, 1, . . . , R−1, r is an index of a modulation symbol, and $x_{m,r}$ is a modulation symbol.

According to a second aspect, a signal transmission method is provided. First, a transmitting end maps a plurality of modulation symbols to a plurality of layers. Then, the transmitting end performs DFT on a modulation symbol at each layer to obtain a third symbol at each layer. Next, the transmitting end performs frequency domain resource mapping and inverse fast Fourier transform IFFT on the third symbol at each layer to obtain a fourth symbol at each layer. Further, the transmitting end performs cyclic shift on a fourth symbol at a part of the layers to obtain a fifth symbol at each of the part of the layers. Finally, the transmitting end precodes the fifth symbol at the part of the layers and the fourth symbol at a remaining part of the layers to obtain a DFT-s-OFDM signal, and transmits the DFT-s-OFDM signal.

In the second aspect, a peak to average power ratio PAPR may be reduced by performing cyclic shift on symbols at the part of layers (the layers may be replaced with antenna ports, streams, or groups).

In a possible implementation, a value of the cyclic shift is related to a second parameter, and the second parameter includes but is not limited to one or more of the following: a layer index, an antenna port index, a stream index, a size of the DFT, a quantity of modulation symbols, a total quantity of layers, a total quantity of antenna ports, a total quantity of streams, a size of the IFFT, a quantity of subcarriers, or T=1/Δf, where Δf is a subcarrier spacing.

In a possible implementation, the value of the cyclic shift is:

$$\frac{N(m-j)}{RM}, \frac{N(m-j)}{RM}+c,$$

an integer obtained through rounding on $$\frac{N(m-j)}{RM},$$

or an integer obtained through rounding on $$\frac{N(m-j)}{RM}+c,$$

where the rounding is: rounding down, rounding up, or rounding off, where

R is the size of the DFT or the quantity of modulation symbols; m is the layer index, the antenna port index, or the stream index; M is an integer greater than or equal to 2; j is an integer greater than or equal to 0; N is the size of the IFFT or the quantity of subcarriers; and c is any value; or
the value of the cyclic shift is:

$$\frac{T(m-j)}{RM}, \frac{T(m-j)}{RM}+c,$$

an integer obtained through rounding on $$\frac{T(m-j)}{RM},$$

or an integer obtained through rounding on $$\frac{T(m-j)}{RM}+c,$$

where the rounding is: rounding down, rounding up, or rounding off, where

R is the size of the DFT or the quantity of modulation symbols; m is the layer index, the antenna port index, or the stream index; M is an integer greater than or equal to 2; j is an integer greater than or equal to 0; T=1/Δf, Δf is a subcarrier spacing; and c is any value.

In a possible implementation, $$c = k \times \frac{N}{R},$$

where k is an integer.

In a possible implementation, M is a total quantity of layers, a total quantity of antenna ports, or a total quantity of streams.

In a possible implementation, a minimum value of j is the same as a minimum value of m.

In a possible implementation, when the cyclic shift is: Nm/RM, the fifth symbol is:

$$z_m(p) = \frac{1}{\sqrt{N}} \times \sum_{n=0}^{R-1} y_m(n) e^{\frac{i2\pi}{N} \times (n+n_0) \times \left(p - \frac{Nm}{RM}\right)},$$

where $z_m(p)$ is a fifth symbol whose index is p at a layer whose index is m, at an antenna port whose index is m, or in a stream whose index is m, $y_m(n)$ is a third symbol whose index is n at the layer whose index is m, at the antenna port whose index is m, or in the stream whose index is m, and m is an integer greater than or equal to 0 and less than or equal to M−1; N is the size of the IFFT or the quantity of subcarriers; $n_0$ is an index of a start subcarrier scheduled for a terminal; p=0, 1, 2 . . . , N−1; and n is a subcarrier index; or when the cyclic shift is: Tm/RM, the fifth symbol is:

$$z_m(t) = \frac{1}{\sqrt{N}} \times \sum_{n=0}^{R-1} y_m(n) e^{i2\pi(n+n_0)\Delta f \times \left(t - \frac{Tm}{RM}\right)},$$

where $z_m(t)$ is a fifth symbol whose index is t at a layer whose index is m, at an antenna port whose index is m, or in a stream whose index is m, $y_m(n)$ is a third symbol whose index is n at the layer whose index is m, at the antenna port whose index is m, or in the stream whose index is m, and m is an integer greater than or equal to 0 and less than or equal to M−1; N is the size of the IFFT or the quantity of subcarriers; $n_0$ is an index of a start subcarrier scheduled for a terminal; p=0, 1, 2 . . . , N−1; n is a subcarrier index; and p=0, 1, 2 . . . , N−1, where $T_{CP}$ is a cyclic prefix CP time, and T=1/Δf, where T=1/Δf is the subcarrier spacing.

In a possible implementation, after mapping the plurality of modulation symbols to the plurality of layers, and before precoding the fifth symbol at the part of the layers and the fourth symbol at a remaining part of the layers, the transmitting end performs phase offset on a symbol at the part of the layers The PAPR may be further reduced.

In a possible implementation, a phase shifted by the phase offset is related to a first parameter; and the first parameter includes one or more of the following: the layer index, the antenna port index, the stream index, a symbol index, the subcarrier index, the size of the DFT, a quantity of modulation symbols, the total quantity of layers, the total quantity of antenna ports, the total quantity of streams, a modulation order, or a quantity of modulation constellation symbols.

In a possible implementation, a second phase shifted by the phase offset is:

$$e^{-i2\pi \frac{(m-j)}{MQ}},$$

where $$e^{-i2\pi \frac{(m-j)}{MQ}},$$

j is an integer greater than or equal to 0, m is the layer index, the antenna port index, or the stream index, M is an integer greater than or equal to 2, and Q is greater than 0.

The phase shifted by the phase offset may be the second phase in the possible implementation of the first aspect. For details, refer to the foregoing descriptions. Details are not repeated.

According to a third aspect, a communication apparatus is provided. The apparatus has a function of implementing any one of the first aspect or the possible implementations in the first aspect, or a function of implementing any one of the second aspect or the possible implementations in the second aspect. The function may be implemented by hardware, or may be implemented by hardware by executing corresponding software. The hardware or software includes one or more functional modules corresponding to the foregoing function.

According to a fourth aspect, a communication apparatus is provided, including a processor and a memory. The memory is configured to store computer programs or instructions. The processor is configured to execute some or all of the computer programs or instructions in the memory, and when the some or all of the computer programs or instructions are executed, the processor is configured to implement functions of the transmitting end in the method according to any one of the first aspect or the possible implementations in the first aspect, or implement functions of the transmitting end in any one of the second aspect or the possible implementations in the second aspect.

In a possible implementation, the apparatus may further include a transceiver, and the transceiver is configured to transmit a signal processed by the processor, or receive a signal input into the processor. The transceiver may perform a transmit action or a receiving action performed by the transmitting end in any one of the first aspect or the possible implementations in the first aspect, or perform a transmit action or a receiving action performed by the transmitting end in any one of the second aspect or the possible implementations in the second aspect.

According to a fifth aspect, this application provides a chip system, including one or more processors (also referred to as processing circuits), where the processor is electrically coupled to a memory (also referred to as a storage medium), the memory may be located in the chip system, or may not be located in the chip system, and the memory is configured to store computer programs or instructions. The processor is configured to execute some or all computer programs or instructions in the memory, and when the some or all computer programs or instructions are executed, the processor is configured to implement functions of the transmitting end in the method according to any one of the first aspect or the possible implementations in the first aspect, or implement functions of the transmitting end in any one of the second aspect or the possible implementations in the second aspect.

In a possible implementation, the chip system may further include an input/output interface, and the input/output interface is configured to output a signal processed by the processor, or receive a signal input into the processor. The input/output interface may perform a transmit action or a receiving action performed by the transmitting end in any one of the first aspect or the possible implementations in the first aspect, or perform a transmit action or a receiving action performed by the transmitting end in any one of the second aspect or the possible implementations in the second aspect. Specifically, the output interface performs a transmitting action, and the input interface performs a receiving action.

In a possible implementation, the chip system may include a chip, or may include a chip and another discrete device.

According to a sixth aspect, a computer-readable storage medium is provided, configured to store a computer program. The computer program includes instructions used to implement the function in any one of the first aspect or the possible implementations in the first aspect, or instructions used to implement the function in any one of the second aspect or the possible implementations in the second aspect.

Alternatively, a computer-readable storage medium is configured to store a computer program. When the computer program is executed by a computer, the computer may be enabled to perform the method performed by the transmitting end in any one of the first aspect or the possible implementations of the first aspect, or perform the method performed by the transmitting end in any one of the second aspect or the possible implementations in the second aspect.

According to a seventh aspect, a computer program product is provided. The computer program product includes computer program code. When the computer program code is run on a computer, the computer is enabled to perform the method performed by the transmitting end in any one of the first aspect or the possible implementations of the first aspect, or perform the method performed by the transmitting end in any one of the second aspect or the possible implementations in the second aspect.

According to an eighth aspect, a communication apparatus is provided, including a processor. The processor is configured to execute a computer program or instructions. When the computer program or the instructions is/are executed, the processor is configured to implement a function of the transmitting end in the method according to any one of the first aspect or the possible implementations of the first aspect, or implement a function of the transmitting end in the method according to any one of the second aspect or the possible implementations in the second aspect. The computer program or instructions may be stored in the processor, or may be stored in a memory, where the memory is coupled to the processor. The memory may be located in the communication apparatus, or may not be located in the communication apparatus.

In a possible implementation, the apparatus further includes a communication interface, where the communication interface is configured to transmit a signal processed by the processor, or receive a signal input into the processor. The communication interface may perform a transmit action or a receiving action performed by the transmitting end in any one of the first aspect or the possible implementations in the first aspect, or perform a transmit action or a receiving action performed by the transmitting end in any one of the second aspect or the possible implementations in the second aspect.

For technical effects in the third aspect to the eighth aspect, refer to the descriptions in the first aspect to the second aspect. Details are not repeated herein.

DESCRIPTION OF EMBODIMENTS

The following describes in detail embodiments of this application with reference to accompanying drawings.

To facilitate understanding of technical solutions in embodiments of this application, the following briefly describes a system architecture of a method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions in embodiments of this application may be applied to various communication systems, for example, a wireless local area network (WLAN) communication system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, and a future communication system.

For ease of understanding embodiments of this application, the following describes an application scenario of this application. A network architecture and a service scenario described in embodiments of this application are intended to describe the technical solutions in embodiments of this application more clearly, and do not constitute any limitation on the technical solutions provided in embodiments of this application. A person of ordinary skill in the art may know that, as a new service scenario emerges, the technical solutions provided in embodiments of this application are also applicable to a similar technical problem.

Figure 1:
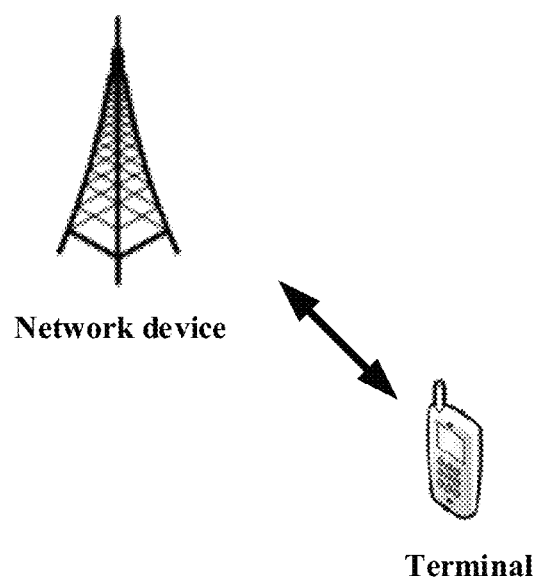
FIG. 1 is a schematic diagram of a communication system according to an embodiment of this application.

The communication system shown in FIG. 1 includes a network device and a terminal. The network device and the terminal may perform wireless communication by using a resource. The resource may include one or more of the following: a time domain resource, a frequency domain resource, a code domain resource, and a space domain resource. This application is also applicable to a system in which a terminal communicates with a terminal, and is also applicable to a system in which a network device communicates with a network device.

A signal may be transmitted between the network device and the terminal in an OFDM waveform or a DFT-s-OFDM waveform. A difference between transmitting the signal in the OFDM waveform and transmitting the signal in the DFT-s-OFDM waveform is whether a DFT operation is performed.

Figure 2A:
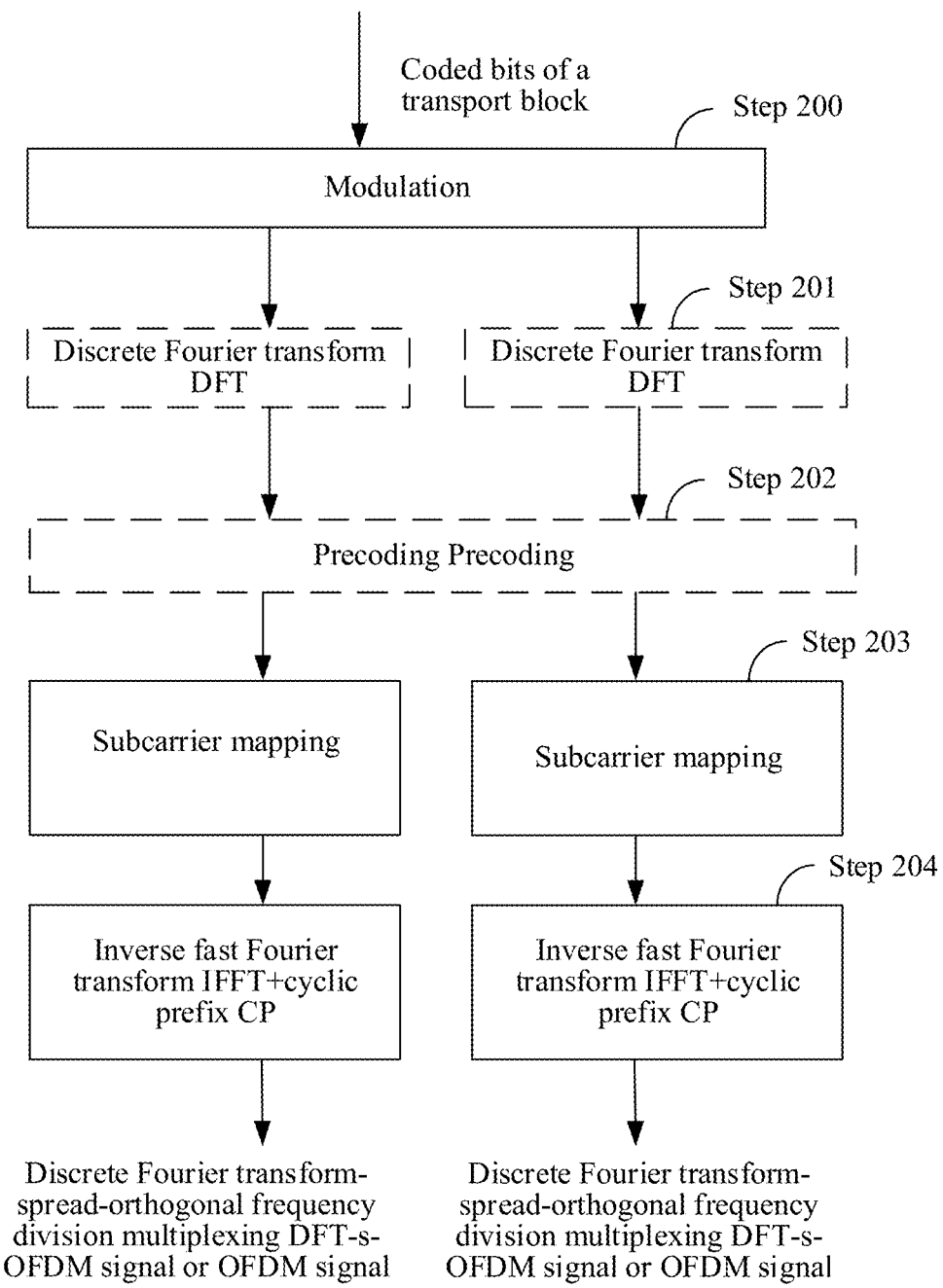
FIG. 2a is a schematic diagram of a signal transmission process applied to a transmitting end according to an embodiment of this application.

As shown in FIG. 2a, the following describes a schematic diagram of a process of transmitting a signal in a DFT-s-OFDM waveform. FIG. 2a shows a processing process of a transmitting end, where the process includes the following steps.

Step 200. Perform channel coding on a transport block to obtain a plurality of coded bits (coded bits), and then perform modulation (modulation) on the plurality of bits to obtain a plurality of modulated symbols, where the modulated symbols may be referred to as modulation symbols, and the modulation symbols may also be referred to as complex-valued symbols.

For example, a modulation scheme may be quadrature amplitude modulation (QAM), offset quadrature amplitude modulation (OQAM), binary phase shift keying (BPSK), pi/2-BPSK, QPSK, pi/4-QPSK, 16 QAM, 64 QAM, 256 QAM, 1024 QAM, or APSK. A modulation order may be 1, 2, 4, 6, 8, or the like, and the modulation order is related to the modulation scheme. The modulation scheme and the modulation order are not limited in this application.

In an example, step 201 is directly performed on the modulation symbols obtained in step 200. In another example, the plurality of modulation symbols obtained in step 200 are mapped to a plurality of groups, and step 201 is performed on each group of modulation symbols. "A plurality of groups" herein is, for example, two, three, four, or even more groups. FIG. 2a is described by using two groups as an example.

Step 201. Perform discrete Fourier transform DFT on the plurality of modulation symbols. The DFT is also referred to as "transform precoding". Step 201 is optional. If the DFT is not performed, an OFDM signal is obtained; or if the DFT is performed, a DFT-s-OFDM signal is obtained. Each symbol obtained through DFT may be referred to as sampling, complex-valued sampling, a complex-valued symbol, or the like.

A size of the DFT is related to a scheduled bandwidth. For example, the size of the DFT is a quantity of resource elements (REs) scheduled for the terminal, and one RE corresponds to one subcarrier. Generally, when scheduling is performed for the terminal, a scheduling unit is a resource block (RB), and one RB corresponds to 12 REs. For ease of implementation, an existing LTE protocol and an existing NR protocol impose a constraint: Size of the DFT=$2^a \times 2^b \times 2^c$, where a, b, or c is a non-negative integer.

When the DFT is performed on the modulation symbols, the size of the DFT may be first determined based on the scheduled bandwidth, and then whether to further divide the group of modulation symbols is determined based on the size of the DFT. In a typical case, the size of the DFT is the same as a quantity of modulation symbols included in the group. For example, a group includes 600 modulation symbols, and the size of the DFT is 600. In another case, the 600 modulation symbols are first divided into several parts, and the DFT is performed on each part. For example, the 600 modulation symbols are divided into three groups, each part includes 200 modulation symbols, and the DFT is performed on the 200 modulation symbols as a whole.

Optionally, step 202. Precode the modulation symbols obtained in step 200 or the symbols obtained in step 201. The precoding may be precoding for codebook-based transmission, or may be precoding for non-codebook-based transmission.

It is to be noted that during the precoding, two groups of symbols are used as an input for the precoding, and each group of symbols is not separately precoded.

In an example, in the codebook-based transmission, the terminal precodes one or more sounding reference signals (SRSs) by using a plurality of candidate precoding matrices specified in a protocol, and then transmits the one or more SRSs to the network device to sound an uplink channel. The network device performs channel estimation based on the one or more SRSs, determines a preferred precoding matrix from the plurality of precoding matrices specified in the protocol, and indicates an index (TPMI) of the preferred precoding matrix to the terminal. In this case, during subsequent data transmission, the terminal precodes data by using the precoding matrix indicated by the network device.

In an example, in non-codebook-based transmission, the terminal determines a plurality of candidate precoding matrix matrices, and separately precodes a plurality of SRSs by using the plurality of precoding matrices determined by the terminal. The network device does not know a plurality of candidate precoding matrices on a terminal side. Therefore, the network device cannot indicate the transmitted precoding matrix indicator, but indicates a sounding reference signal resource index (SRI) to the terminal. Further, the terminal determines the precoding matrix based on the SRI indicated by the network device, and further precodes data by using the precoding matrix indicated by the SRI in subsequent data transmission.

Step 203. Map the symbols obtained in step 200, the symbols obtained in step 201, or the symbols obtained in step 202 to a frequency domain resource. If the plurality of modulation symbols obtained in step 200 are mapped to a plurality of groups, frequency domain resources corresponding to the plurality of groups are the same. The frequency domain resource herein is a location of a bandwidth scheduled for the terminal. The frequency domain resource mapping may be specifically subcarrier mapping.

Step 204. Perform operations such as inverse fast Fourier transform (IFFT) and cyclic prefix (CP) addition on a frequency domain signal obtained through frequency domain resource mapping, to obtain the DFT-s-OFDM signal or the OFDM signal; and transmit the signal obtained by performing a series of processing such as transmit power adjustment on the signal.

Specifically, the DFT-s-OFDM signal or the OFDM signal may be transmitted on a corresponding antenna port or antenna.

Figure 2B:
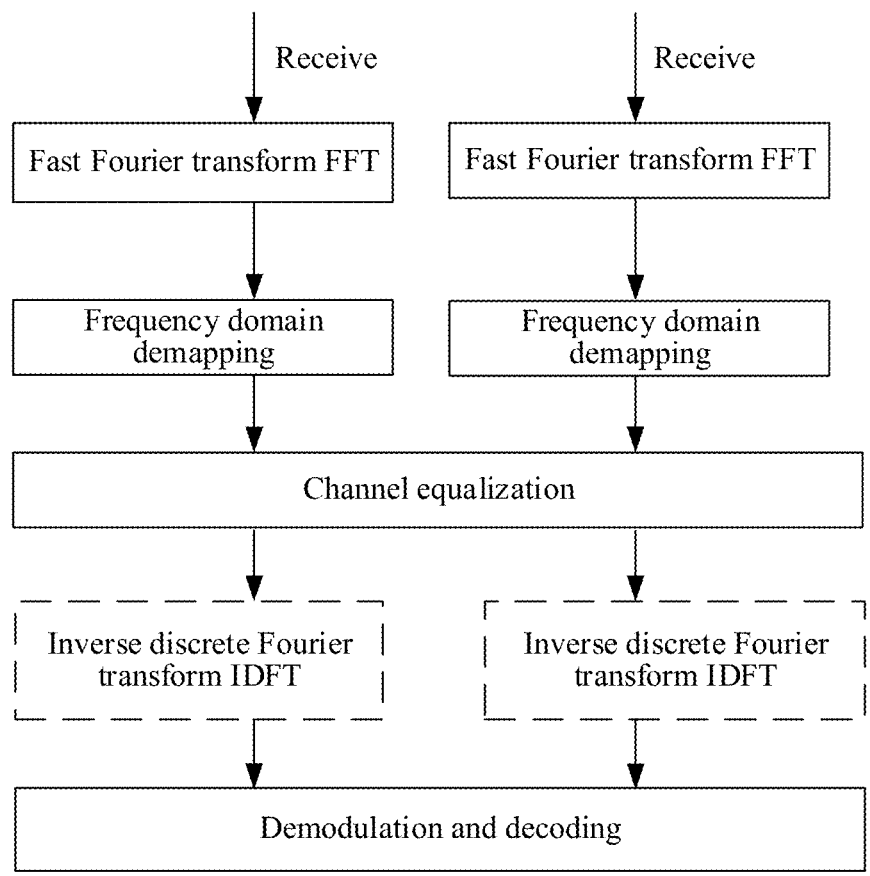
FIG. 2b is a schematic diagram of a signal transmission process applied to a receiving end according to an embodiment of this application.

FIG. 2b shows a processing process, performed by a receiving end, that corresponds to the processing process performed by the transmitting end shown in FIG. 2a. A series of processing, such as FFT, frequency domain demapping, channel equalization (to be specific, reducing or even eliminating impact of a spatial channel on a signal), inverse discrete Fourier transform IDFT (inverse DFT), demodulation, and channel decoding, is also performed on a signal received by an antenna at the receiving end. The processing process of the receiving end is a reverse process of the processing process of the transmitting end, and details are not described herein.

In addition, signals may be transmitted between the network device and the terminal through a plurality of layers, or may be transmitted through a single layer. With reference to a grouping operation before step 201, in a possible implementation, one group corresponds to one layer, and a plurality of groups correspond to a plurality of layers. In another possible implementation, a plurality of groups correspond to one layer.

In a current NR communication system, it is specified as follows:

When data is transmitted by using an OFDM waveform, multi-layer transmission is used. When the multi-layer transmission is used, the precoding matrix may be further classified into two types: a non-coherent (non-coherent) precoding matrix and a coherent (coherent) precoding matrix. Referring to Table 1, Table 2, Table 3, and Table 4 below, a quantity of elements included in a row is a quantity of layers, that is, columns correspond to layers, and a quantity of columns is a quantity of layers. A quantity of elements included in a column is a quantity of antenna ports, that is, rows correspond to antenna ports, and a quantity of rows is a quantity of antenna ports. The non-coherent (non-coherent) precoding matrix is used to perform multi-antenna non-coherent transmission. The coherent (coherent) precoding matrix is used to perform multi-antenna coherent transmission. A terminal having a coherent transmission capability may be selected from all precoding matrices, and a terminal not having a coherent transmission capability may be selected only from a non-coherent precoding matrix.

When the terminal transmits data in the DFT-s-OFDM waveform, only a single layer may be used to perform transmission.

However, the single-layer transmission cannot fully utilize a degree of freedom of a MIMO channel, resulting in poor transmission performance and low transmission efficiency. If the terminal uses the multi-layer transmission similar to OFDM, a peak to average power ratio (PAPR) is relatively high.

Based on this, this application provides a plurality of manners of transmitting a DFT-s-OFDM signal by using a plurality of layers, so that the PAPR may be reduced.

In one manner, phase offset is performed on signals at a part of layers, and phase offset is not performed on signals at another part of layers.

In another manner, cyclic shift is performed on signals at a part of layers in time domain, and cyclic shift is not performed on signals at another part of layers.

Further, the technical solutions of this application may further support multi-stream coherent transmission. Relative to the non-coherent transmission, coherent transmission has better matching performance on the MIMO channel, and therefore transmission performance is better.

For ease of understanding embodiments of this application, the following describes some terms in embodiments of this application, to help a person skilled in the art have a better understanding.

(1) A network device is a device that can provide a random access function for a terminal device or a chip that can be disposed in the device. The device includes but is not limited to an evolved NodeB (eNB), a radio network controller (RNC), a NodeB (NB), a base station controller (BSC), a base transceiver station (BTS), a home base station (for example, home evolved NodeB or home NodeB(HNB)), a baseband unit (BBU), an access point (AP) in a wireless fidelity (Wi-Fi) system, a wireless relay node, a wireless backhaul node, a transmission point (transmission and reception point (TRP), or transmission point (TP)), or the like, may be a gNB or a transmission point (TRP or TP) in a 5G system such as an NR system or one or one group of antenna panels (including a plurality of antenna panels) of a base station in a 5G system, or may be a network node forming a gNB or a transmission point, for example, a baseband unit (BBU) or a distributed unit (DU).

(2) A terminal device, also referred to as user equipment (UE), a mobile station (MS), a mobile terminal (MT), a terminal, or the like, is a device that provides voice and/or data connectivity for a user. For example, the terminal device is a handheld device, a vehicle-mounted device, or the like that has a wireless connection function. Currently, the terminal device may be: a mobile phone, a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self-driving, a wireless terminal in remote medical surgery, a wireless terminal in a smart grid, a wireless terminal in transportation safety (transportation safety), or a wireless terminal in a smart city, or a wireless terminal in a smart home (smart home), or a wireless terminal that has a vehicle-to-vehicle (V2V) sharing.

(3) Orthogonal frequency division multiplexing OFDM: is a multi-carrier transmission waveform based on frequency division multiplexing, and signals (also referred to as carriers/subcarriers) participating in multiplexing are orthogonal. An OFDM technology converts a high-speed stream into a plurality of parallel low-speed streams through serial/parallel conversion, and then allocates the streams to several subcarriers of different frequencies for transmission. The OFDM technology uses orthogonal subcarriers, so that spectrums of the subcarriers are overlapped. In a conventional FDM multi-carrier modulation system, a guard interval is required between subcarriers. Compared with the conventional FDM multi-carrier modulation system, the OFDM technology greatly improves spectrum utilization.

(4) Discrete Fourier transform-spread-orthogonal frequency division multiplexing DFT-s-OFDM: as the name suggests, is a derivative technology based on the OFDM. Intuitively, DFT processing (or transform precoding) is performed on a subcarrier, to transform from time domain to frequency domain; and then OFDM modulation is performed on a frequency domain signal (that is, input into an IFFT module). In this way, the signals are converted to time domain together, and are transmitted. After improvement by the DFT, the signal is returned from the frequency domain signal (conventional OFDM) to a time domain signal (the same as a single-carrier system). In the technology, a modulated signal waveform is similar to a single-carrier waveform. Although the modulated signal waveform is evolved from the OFDM technology, some people also consider the modulated signal waveform as a single-carrier technology.

(5) Several precoding matrices (Precoding matrices) applicable to this application are described.

TABLE 1

Precoding matrix W for two-layer transmission using two antenna ports with transform precoding disabled (OFDM)
(Precoding matrix for two-layer transmission using two antenna ports with transform precoding disabled)

| TPMI index | W ordered from left to right in increasing order of TPMI indexes (ordered from left to right in increasing order of TPMI index) | | |
| --- | --- | --- | --- |
| 0-2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

In Table 1, the precoding matrix whose index is 0 is a non-coherent (non-coherent) precoding matrix, and the precoding matrices whose indexes are 1 and 2 are (completely) coherent (coherent) precoding matrices.

TABLE 2

Precoding matrix W for two-layer transmission using four antenna ports with transform precoding disabled (OFDM)
(Precoding matrix for two-layer transmission using four antenna ports with transform precoding disabled)

| TPMI index | W ordered from left to right in increasing order of TPMI indexes (ordered from left to right in increasing order of TPMI index) | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20 and 21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | — | — |

In Table 2, the precoding matrices whose indexes are 0 to 5 are non-coherent precoding matrices, the precoding matrices whose indexes are 6 to 13 are partially coherent precoding matrices, and the precoding matrices whose indexes are 14 to 21 are (completely) coherent precoding matrices.

In Table 3, the precoding matrix whose index is 0 is a non-coherent (non-coherent) precoding matrix, the precoding matrices whose indexes are 1 and 2 are partially coherent precoding matrices, and the precoding matrices whose indexes are 3 to 6 are (completely) coherent precoding matrices.

TABLE 3

Precoding matrix W for three-layer transmission using four antenna ports with transform precoding disabled (OFDM)
(Precoding matrix for three-layer transmission using four antenna ports with transform precoding disabled)

| TPMI index | W ordered from left to right in increasing order of TPMI indexes (ordered from left to right in increasing order of TPMI index) | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | — |

TABLE 4

Precoding matrix W for four-layer transmission using four antenna
ports with transform precoding disabled (OFDM)
(Precoding matrix for four-layer transmission using
four antenna ports with transform precoding disabled)

| TPMI index | W ordered from left to right in increasing order of TPMI indexes (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

In Table 4, the precoding matrix whose index is 0 is a non-coherent (non-coherent) precoding matrix, the precoding matrices whose indexes are 1 and 2 are partially coherent (partially coherent) precoding matrices, and the precoding matrices whose indexes are 3 and 4 are (completely) coherent (coherent) precoding matrices.

(6) Peak to average power ratio (PAPR)

It is observed in time domain that an amplitude of a radio signal changes constantly. Therefore, an instantaneous transmit power of the radio signal is not constant. The peak to average power ratio PAPR is referred to as a peak to average ratio for short. The peak to average power ratio may be a ratio, in a symbol, of an instantaneous power peak value of continuous signals to a signal power average value. The peak to average power ratio may be represented by the following formula:

$$PAPR = 10 \times \log_{10}\left(\frac{\max|x_i|^2}{\text{mean } |x_i|^2}\right).$$

$x_i$ represents a time domain discrete value of a group of sequences, $\max|x_i|^2$ represents a maximum value of a square of the time domain discrete value, and $\text{mean}|x_i|^2$ represents an average value of the square of the time domain discrete value.

An OFDM symbol is formed by superposing a plurality of independently modulated subcarrier signals. When phases of subcarriers are the same or similar, the superposed signals are modulated by signals with a same initial phase, to generate a large instantaneous power peak value. Therefore, a PAPR is high. The high PAPR causes non-linear distortion of signals, obvious spectrum extension interference, and in-band signal distortion, and deteriorates system performance.

The following describes the solution in detail with reference to the accompanying drawings. Features or content denoted by dashed lines in the accompanying drawings may be understood as optional operations or optional structures in embodiments of this application.

Figure 3A:
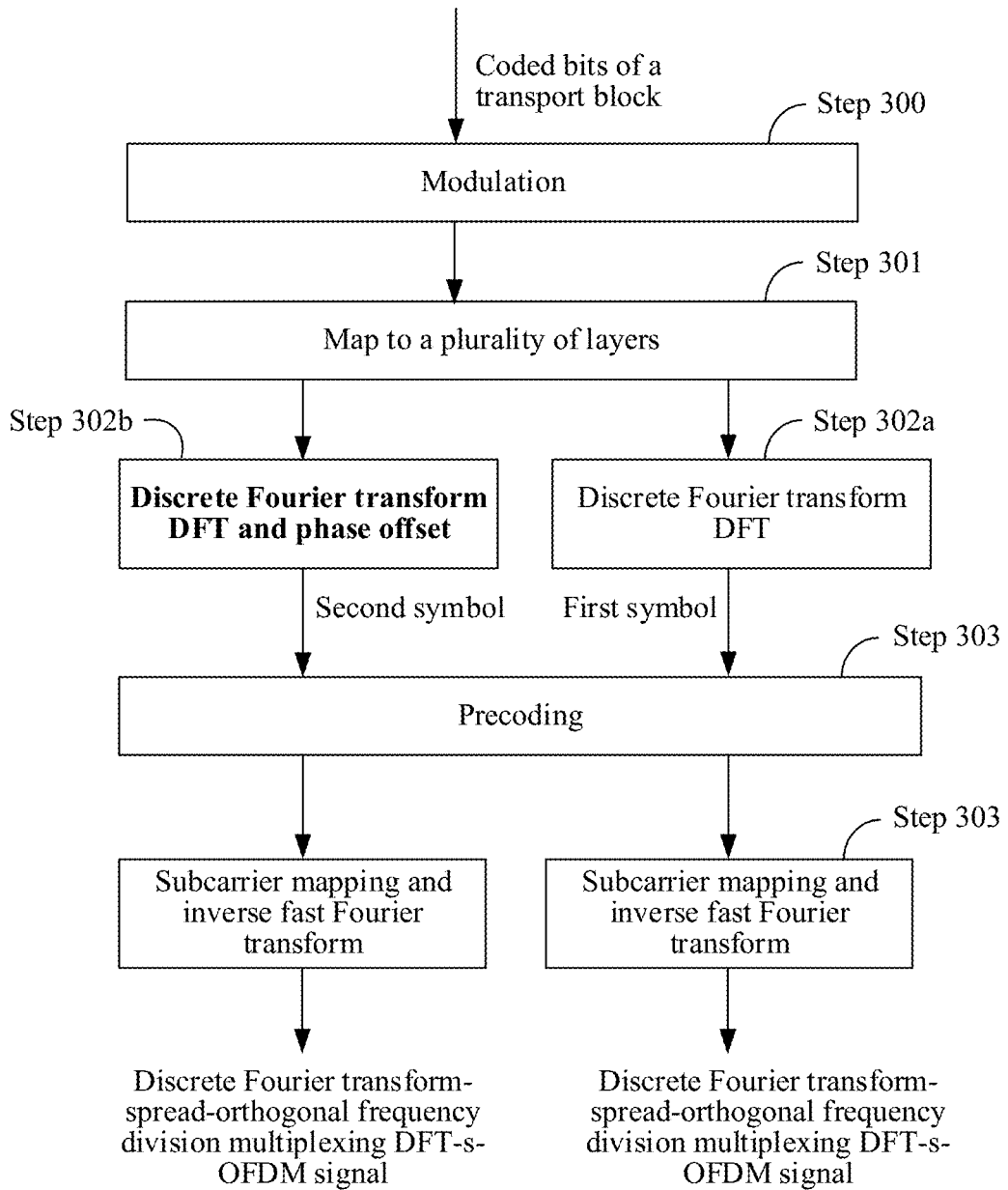
FIG. 3a is a schematic diagram of a signal transmission process applied to a transmitting end according to an embodiment of this application.

FIG. 3a is a schematic diagram of a signal transmission process. The method may be applied to codebook-based transmission, or may be applied to non-codebook-based transmission. The transmitting end in this example may be the network device in FIG. 1, or may be the terminal in FIG. 1.

Step 300. Perform channel coding on a transport block to obtain a plurality of coded bits, and then perform modulation on the plurality of bits to obtain a plurality of modulated symbols, where the modulated symbols may be referred to as modulation symbols, and the modulation symbols may also be referred to as complex-valued symbols. A process in step 300 is the same as a process in step 200, and details are not repeated herein.

Step 301. The transmitting end maps the plurality of modulation symbols to a plurality of layers to obtain a mapped modulation symbol corresponding to each layer. "A plurality of layers" herein is, for example, two, three, four, or even more layers.

In one time of mapping, one or more consecutive modulation symbols are mapped to one layer.

For example, there are 1800 modulation symbols. When the modulation symbols are mapped to three layers: a, b, and c, the first 600 modulation symbols are mapped to the layer a, the middle 600 modulation symbols are mapped to the layer b, and the last 600 modulation symbols are mapped to the layer c.

For example, when the modulation symbols are mapped to three layers: a, b, and c, the first modulation symbol is mapped to the layer a, the second modulation symbol is mapped to the layer b, and the third modulation symbol is mapped to the layer c. The rest can be deduced by analogy. A $(3i+1)^{th}$ modulation symbol is mapped to the layer a, a $(3i+2)^{th}$ modulation symbol is mapped to the layer b, and a $(3i+3)^{th}$ modulation symbol is mapped to the layer c, where i is greater than or equal to 0. This mapping manner may be referred to as comb mapping.

For example, two or more consecutive modulation symbols form one group, and the comb mapping is performed on each group. For example, if the modulation symbols are mapped to two layers, namely, a and b, by using two modulation symbols as one group, a $(4i+1)^{th}$ modulation symbol and a $(4i+2)^{th}$ modulation symbol are mapped to the layer a, and a $(4i+3)^{th}$ modulation symbol and a $(4i+4)^{th}$ modulation symbol are mapped to the layer b.

In this application, a mapping manner of mapping the modulation symbol to the layer is not limited.

In this application, the plurality of layers are divided into two parts. Steps performed on a part of the layers are similar to the steps performed in FIG. 2a, and one more operation, namely, phase offset, needs to be performed on a remaining part of the layers. For ease of description below, the part of the layers are referred to as a first layer, and the remaining part of the layers are referred to as a second layer. A difference between the first layer and the second layer lies in that: Phase offset is performed on a modulation symbol mapped to the second layer, and is not performed on a modulation symbol mapped to the first layer.

There are one or more first layers, and there are one or more second layer. For example, when a quantity of the plurality of layers is two, there is one first layer, and there is also one second layer. For another example, when a quantity of the plurality of layers is three, in an example, there is one first layer, and there are two second layers; in another example, there are two first layers, and there is one second layer.

Step 302a is performed on a modulation symbol mapped to the first layer.

Step 302a. The transmitting end performs discrete Fourier transform DFT (namely, transform precoding) on the modulation symbol mapped to each first layer, to obtain a first symbol. A process in step 302a is the same as the process in step 201 in FIG. 2a, and details are not repeated. For example, the first symbol may be represented by Formula 1, Formula 2, or Formula 3 below. The first symbol is a symbol obtained through DFT, and may be referred to as sampling, complex-valued sampling, a complex-valued symbol, or the like.

Step 302b is performed on a modulation symbol mapped to the second layer.

Step 302b. The transmitting end performs discrete Fourier transform DFT (namely, transform precoding) and phase offset on the modulation symbol at each second layer separately to obtain a second symbol. A sequence of the DFT and the phase offset is not limited. A DFT process in step 302b is the same as the process in step 201 in FIG. 2a, and details are not repeated. A specific process of the phase offset is described in detail below. The second symbol may be referred to as sampling, complex-valued sampling, a complex-valued symbol, or the like.

Step 303. The transmitting end performs first processing on the first symbol obtained in step 302a and the second symbol obtained in step 302b, to obtain a DFT-S-OFDM signal, and transmits the DFT-S-OFDM signal. The first processing includes but is not limited to one or more of the following:

resource mapping (for example, frequency domain resource mapping, which may be specifically subcarrier mapping), inverse fast Fourier transform IFFT, or precoding. In FIG. 3a, the precoding is first performed, and then the frequency domain resource mapping and the IFFT are performed. It is to be noted that during the precoding, both the symbol at the first layer and the symbol at the second layer are used as an input for the precoding, instead of being separately precoded. When the frequency domain resource mapping is performed, frequency domain resource mapping may be separately performed on the symbol at each layer. When the IFFT is performed, the IFFT may be separately performed on the symbol at each layer.

In addition, cyclic prefix CP addition, power adjustment, transmitting, and the like may further be performed on the symbol. A process in step 303 is the same as the process in step 202 to the process in step 204 in FIG. 2a, and details are not repeated.

Phase offset is performed on a symbol at a part of layers (where the layers may be replaced with antenna ports, streams, or groups), so that a PAPR can be reduced.

In an embodiment, "mapping to a plurality of layers" in step 301 may also be replaced with "mapping to a plurality of streams". Correspondingly, "layers" in step 302a, step 302b, and step 303 may be replaced with "streams", that is, a modulation symbol mapped to each stream is processed.

In an embodiment, "mapping to a plurality of layers" in step 301 may also be replaced with "mapping to a plurality of antenna ports". Correspondingly, "layers" mentioned in step 302a, step 302b, and step 303 may be replaced with "antenna ports", that is, a modulation symbol mapped to each antenna port is processed. The antenna port may be a physical antenna port, or may be a logical antenna port.

In an embodiment, "mapping to a plurality of layers" in step 301 may also be replaced with "mapping to a plurality of groups". Correspondingly, "layers" mentioned in step 302a, step 302b, and step 303 may be replaced with "groups", that is, a modulation symbol mapped to each group is processed.

For example, one group may correspond to one layer, and a plurality of groups correspond to a plurality of layers. The example is equivalent to an example in FIG. 3a.

For example, one group may correspond to a plurality of layers. For example, two groups correspond to one layer, and three groups correspond to one layer.

For example, a part of groups may correspond to one layer, and another part of groups may correspond to a plurality of layers. For example, a group 1 corresponds to one layer, a group 2 corresponds to two layers, and even one group corresponds to more layers. In the example, when a group performs phase offset as a whole, shifted phases of a plurality of layers corresponding to the group are the same. In an actual application, group-based phase offset helps simplify implementation complexity of a transmitting end or a receiving end. Alternatively, when phase offset is performed on one layer as a whole, shifted phases of a plurality of layers corresponding to the group may be different. The solution is more flexible, so that a performance gain is better.

For example, a plurality of groups may correspond to one layer. For example, a group 1 corresponds to one layer, a group 2 and a group 3 correspond to one layer, and even more groups correspond to one layer. In the example, when a layer performs phase offset as a whole, shifted phases of a plurality of groups corresponding to the layer are the same. In an actual application, group-based phase offset helps simplify implementation complexity of a transmitting end or a receiving end.

A correspondence between a group and an antenna port is similar to a correspondence between a group and a layer, and only "layers" in the foregoing several examples are replaced with "antenna ports", and details are not repeated herein.

A correspondence between a group and a stream is similar to a correspondence between a group and a layer, and only "layers" in the foregoing several examples are replaced with "streams", and details are not repeated herein.

In this application, a plurality of symbols (or complex-valued symbols) that are processed together are also referred to as a symbol block. For example, a plurality of modulation symbols before discrete Fourier transform is performed are also referred to as modulation symbol blocks or complex modulation symbol blocks. For another example, a plurality of symbols obtained through discrete Fourier transform are also referred to as symbol blocks. In a specific scenario of the present invention, based on a quantity of symbols involved in actual processing, a "symbol" involved in "single symbol" processing may be understood as a "symbol", and a "symbol" involved in "a plurality of symbols" may be understood as a "symbol" or a "symbol block".

The following describes in detail a "phase offset" process in step 302b.

For each symbol (if the DFT is performed first and then the phase offset is performed, the symbol is a symbol obtained through DFT; and if the phase offset is performed first and then the DFT is performed, the symbol is a modulation symbol), when the phase offset is performed on the symbol, the symbol may have a fixed phase.

To improve transmission performance, a shifted phase is flexibly determined. For example, the shifted phase is related to a first parameter, and the first parameter includes but is not limited to one or more of the following:

a layer index, an antenna port index, a stream index, a group index, a symbol index, a subcarrier index, a size of the DFT, a quantity of modulation symbols, a total quantity of layers, a total quantity of antenna ports, a total quantity of streams, a total quantity of groups, a modulation order, or a quantity of modulation constellation symbols.

The following describes the first parameter in detail.

The layer index is an index of a layer to which a symbol is mapped.

The antenna port index is an index of an antenna port to which a symbol is mapped.

The stream index is an index of a stream to which a symbol is mapped.

The group index is an index of a group to which a symbol is mapped. When one group corresponds to one layer, the group index may be considered as the layer index. When one group corresponds to one antenna port, the group index may be considered as the antenna port index. When one group corresponds to one stream, the group index may be considered as the stream index.

The symbol index is an index of a symbol (if the DFT is performed first and then the phase offset is performed, the symbol is a symbol obtained through DFT; and if the phase offset is performed first and then the DFT is performed, the symbol is a modulation symbol) of a layer (the layer may be replaced with an antenna port, a stream, or a group) to which the symbol is mapped. A layer is used as an example for description. For example, in step 301, there are 1800 modulation symbols, the 1800 modulation symbols are mapped to three layers, and 600 modulation symbols are mapped to one layer. In this case, a symbol index is an index of the symbol in the 600 symbols, but not an index of the symbol in the 1800 symbols.

The subcarrier index: is a subcarrier index in which a layer (the layer may be replaced with an antenna port, a stream, or a group) is configured with a part of subcarriers in the scheduled bandwidth, the subcarrier index of the subcarrier mapped by the symbol among the subcarriers (a part of the scheduled bandwidth) configured at the layer (the layer may be replaced with an antenna port, a stream, or a group), rather than a subcarrier index obtained by considering subcarriers at all layers (the layers may be replaced with antenna ports, streams, or groups) as a whole. A subcarrier may also be understood as a resource element (RE).

The size of the DFT: is a size of the DFT corresponding to a layer (the layer may be replaced with an antenna port, a stream, or a group) to which the symbol is mapped. Generally, sizes of the DFT corresponding to different layers (layers may be replaced with antenna ports, streams, or groups) are the same, but may also be different. In step 201 in FIG. 2a, a case in which a size of the DFT is related to a scheduled bandwidth is described. For example, the size of the DFT is a quantity of resource elements (RE) scheduled for the terminal, and one RE corresponds to one subcarrier. Generally, a symbol mapped to one layer (the layer may be replaced with an antenna port, a stream, or a group) may be used as a whole to perform the DFT. For example, if 600 modulation symbols are mapped to one layer, a size of the DFT is 600.

The quantity of modulation symbols: is a total quantity of modulation symbols included in a layer (the layer may be replaced with an antenna port, a stream, or a group) to which the symbol is mapped. A layer is used as an example for description. For example, in step 301, if there are 1800 modulation symbols, the 1800 modulation symbols are mapped to three layers, and 600 modulation symbols are mapped to one layer, the quantity of modulation symbols is 600.

The modulation order is related to a modulation scheme. For example, when the modulation scheme is quadrature phase shift keying QPSK or 4-QAM, the modulation order is 2. For another example, when the modulation scheme is BPSK or pi/2-BPSK, the modulation order is 1.

The modulation order may alternatively be represented by a quantity of modulation constellation symbols (or a size of a set of modulation symbols). For example, the modulation order is O, and the quantity of modulation constellation symbols is Q, where $Q=2^O$.

It is to be noted that the "layer", "stream", "antenna port", or "group" used in step 301, step 302a, step 302b, and step 303 is decoupled from a first parameter referred by the phase offset being a parameter related to the "layer", a parameter related to the "antenna port", a parameter related to the "stream", or a parameter related to the "group". The parameter related to the "layer" is, for example, a layer index and a total quantity of layers; the parameter related to the "antenna port" is, for example, an antenna port index and a total quantity of antenna ports; the parameter related to the "stream" is, for example, a stream index and a total quantity of streams; and the parameter related to the "group" is, for example, a group index and a total quantity of groups. For example, when a plurality of modulation symbols are mapped to a plurality of layers, the first parameter may include a layer index and a total quantity of layers; or the first parameter includes a stream index and a total quantity of layers; or the first parameter includes an antenna port index and a total quantity of streams.

When phase offset is performed on a symbol, the shifted phase may include a first phase and/or a second phase. The following describes several examples of the first phase and the second phase in detail with reference to the first parameter described above.

In an example, the first phase is:

$$e^{-i2\pi\frac{(m-j)}{RM}\times n}.$$

$i=\sqrt{-1}$, and j is an integer greater than or equal to 0. For example, a minimum value of j is the same as a minimum value of m. For example, if m starts from 0, j=0, and if m starts from 1, j=1; R is a size of the DFT or a quantity of modulation symbols; n is a symbol index or a subcarrier index; m is a layer index, an antenna port index, a stream index, or a group index, and m usually starts from 0; and M is an integer greater than or equal to 2, for example, M is a total quantity of layers, a total quantity of antenna ports, a total quantity of streams, or a total quantity of groups.

In an example, the first phase is:

$$e^{-i2\pi\left(\frac{(m-j)}{RM}+d\right)\times n}.$$

i=$\sqrt{-1}$, and j is an integer greater than or equal to 0. For example, a minimum value of j is the same as a minimum value of m. For example, if m starts from 0, j=0, and if m starts from 1, j=1; R is a size of the DFT or a quantity of modulation symbols; n is a symbol index or a subcarrier index; m is a layer index, an antenna port index, a stream index, or a group index, and m usually starts from 0; M is an integer greater than or equal to 2, for example, M is a total quantity of layers, a total quantity of antenna ports, a total quantity of streams, or a total quantity of groups; and d is greater than 0, for example, d=k/R, and k is an integer greater than or equal to 0.

In an example, the second phase is:

$$e^{-i2\pi \frac{(m-j)}{MQ}}.$$

i=$\sqrt{-1}$, and j is an integer greater than or equal to 0. For example, a minimum value of j is the same as a minimum value of m. For example, if m starts from 0, j=0, and if m starts from 1, j=1; m is a layer index, an antenna port index, a stream index, or a group index, and m usually starts from 0; M is an integer greater than or equal to 2, for example, M is a total quantity of layers, a total quantity of antenna ports, a total quantity of streams, or a total quantity of groups; and Q is greater than 0, for example, Q is related to a modulation order, and for example, Q is a modulation order or a quantity of modulation constellation symbols (or a size of a set of modulation symbols).

With reference to the foregoing several examples of the first phase and/or the second phase, the following describes in detail several examples of the second symbol obtained by performing "phase offset".

Before the second symbol obtained by performing phase offset is described, a first symbol obtained by skipping performing phase offset is first described: $y_m(n)$ is a symbol (that is, the first symbol) whose index is n at a layer, an antenna port, a stream, or in a group whose index is m.

In an example, $$y_m(n) = \frac{1}{\sqrt{R}} \times \sum_{r=0}^{R-1} x_{rM+m} e^{-\frac{i2\pi}{R} \times rn}. \quad \text{(Formula 1)}$$

The example is applicable to a scenario in which a relatively large quantity of modulation symbols are continuously mapped to a plurality of layers (the layers may be replaced with antenna ports, streams, or groups). A layer is used as an example for description. For example, there are 1800 modulation symbols. When the modulation symbols are mapped to three layers: a, b, and c, the first 600 modulation symbols are mapped to one layer, namely, a, the middle 600 modulation symbols are mapped to one layer, namely, b, and the last 600 modulation symbols are mapped to one layer, namely, c.

In an example, $$y_m(n) = \frac{1}{\sqrt{R}} \times \sum_{r=0}^{R-1} x_{mR+r} e^{-\frac{i2\pi}{R} \times rn}. \quad \text{(Formula 2)}$$

The example is applicable to a scenario in which a modulation symbol is mapped to a plurality of layers (the layers may be replaced with antenna ports, streams, or groups) in a combing manner.

The foregoing Formula 1 and Formula 2 may be unified as:

$$y_m(n) = \frac{1}{\sqrt{R}} \times \sum_{r=0}^{R-1} x_{m,r} e^{-\frac{i2\pi}{R} \times rn}. \quad \text{(Formula 3)}$$

Meanings of letters in the foregoing Formula 1, Formula 2, and Formula 3 are the same as meanings of letters in the foregoing phase offset. For example, i=$\sqrt{-1}$, r=0, 1, . . . , R−1, and r is an index of a modulation symbol; R is a size of the DFT or a quantity of modulation symbols; $x_{m,\ r}$ represents a modulation symbol mapped to a layer whose index is m, or a modulation symbol whose index is r in an antenna port, a stream, or a group; m starts from 0, 1, 2, . . . , or M−1; n is a symbol index, or a subcarrier index, and regardless of the first symbol, a symbol obtained through DFT, or a modulation symbol, values of indexes are the same; and $x_{m,\ r}$ is a modulation symbol.

The following describes a second symbol obtained by performing phase offset: $y_m(n)$ is a symbol (that is, the second symbol) whose index is n at a layer, an antenna port, a stream, or in a group whose index is m: Second symbol=First symbol×Shifted phase. The shifted phase may be the first phase and/or the second phase described above. Note: m starts from 0, and j in the first phase and/or the second phase described above is 0.

For example, compared with Formula 1, a second symbol obtained by shifting the first phase $$e^{-i2\pi \frac{m}{RM} \times n}$$

is:

$$y_m(n) = \frac{1}{\sqrt{R}} \times e^{-i2\pi \frac{m}{RM} \times n} \times \sum_{r=0}^{R-1} x_{rM+m} e^{-\frac{i2\pi}{R} \times rn}. \quad \text{(Formula 4)}$$

For example, compared with Formula 2, a second symbol obtained by shifting the first phase:

$$e^{-i2\pi \frac{m}{RM} \times n}$$

is:

$$y_m(n) = \frac{1}{\sqrt{R}} \times e^{-i2\pi \frac{m}{RM} \times n} \times \sum_{r=0}^{R-1} x_{mR+r} e^{-\frac{i2\pi}{R} \times rn}. \quad \text{(Formula 5)}$$

For example, compared with Formula 3, a second symbol obtained by shifting the first phase:

$$e^{-i2\pi \frac{m}{RM} \times n}$$

is:

$$y_m(n) = \frac{1}{\sqrt{R}} \times e^{-i2\pi \frac{m}{RM} \times n} \times \sum_{r=0}^{R-1} x_{m,r} e^{-\frac{i2\pi}{R} \times rn}. \quad \text{(Formula 6)}$$

For example, compared with Formula 3, a second symbol obtained by shifting the first phase:

$$e^{-i2\pi\left(\frac{m}{RM}+\frac{k}{R}\right)\times n}$$

is:

$$y_m(n) = \frac{1}{\sqrt{R}} \times e^{-i2\pi\left(\frac{m}{RM}+\frac{k}{R}\right)\times n} \times \sum_{r=0}^{R-1} x_{m,r} e^{-\frac{i2\pi}{R}\times rn}. \quad \text{(Formula 7)}$$

For example, compared with Formula 3, the second symbol obtained by shifting the second phase:

$$e^{-i2\pi\frac{m}{MQ}}$$

is:

$$y_m(n) = \frac{1}{\sqrt{R}} \times e^{-i2\pi\frac{m}{MQ}} \times \sum_{r=0}^{R-1} x_{m,r} e^{-\frac{i2\pi}{R}\times rn}. \quad \text{(Formula 8)}$$

For example, compared with Formula 3, the second symbol obtained by shifting the first phase $$e^{-i2\pi\frac{m}{RM}\times n}$$

and the second phase $$e^{-i2\pi\frac{m}{MQ}}$$

is:

$$y_m(n) = \frac{1}{\sqrt{R}} \times e^{-i2\pi\frac{m}{RM}\times n} \times e^{-i2\pi\frac{m}{MQ}} \times \sum_{r=0}^{R-1} x_{m,r} e^{-\frac{i2\pi}{R}\times rn}. \quad \text{(Formula 9)}$$

In a specific example, in Formula 8, when Q=4 and M=2, the following may be obtained:

$$y_m(n) = \frac{1}{\sqrt{R}} \times e^{-i2\pi\frac{m}{8}} \times \sum_{r=0}^{R-1} x_{m,r} e^{-\frac{i2\pi}{R}\times rn}. \quad \text{(Formula 10)}$$

When phase offset is performed on symbols mapped to different layers (the "layer" may be replaced with an "antenna port", a "stream", or a "group"), there may be the following cases.

Case 1.1: All second layers are offset by a first phase.
Case 1.2: All second layers are offset by a second phase.
Case 1.3: All second layers are offset by a first phase and a second phase.
Case 1.4: A part of second layers are offset by a first phase, and another part of second layers are offset by a second phase.
Case 1.5: A part of second layers are offset by a first phase, and another part of second layers are offset by a first phase and a second phase.
Case 1.6: A part of second layers are offset by a second phase, and another part of second layers are offset by a first phase and a second phase.
Case 1.7: A part of second layers are offset by a first phase, a part of second layers are offset by a second phase, and another part of second layers are offset by the first phase and the second phase.

With reference to the foregoing seven cases of phase offset that is performed, the first phase may be represented by two formulas, and factors such as values of different first parameter are different. With reference to these details, a relatively large quantity of examples of the phase offset may be obtained, and all the examples fall within a protection scope of this application, and are not listed one by one.

In addition, the shifted phase may be specified in a protocol. To better implement coherent transmission, that is, precoding has a better matching degree on a channel, the transmitting end and the receiving end may also negotiate with each other on a shifted phase. For example, the transmitting end determines the shifted phase, and notifies the receiving end of the shifted phase, or notifies the receiving end of a manner of determining the shifted phase. For another example, the receiving end determines the shifted phase, and notifies the transmitting end of the shifted phase, or notifies the transmitting end of a manner of determining the shifted phase. The transmitting end may be a terminal or a network device, and the receiving end may also be a terminal or a network device.

In addition, the transmitting end (for example, the terminal) may perform phase offset only on data, but does not perform phase offset on a demodulation reference signal (demodulation reference signal, DMRS). Certainly, the transmitting end (for example, the terminal) may perform phase offset on data, or perform phase offset on the DMRS. A shifted phase of the DMRS may be the same as or different from a shifted phase of the data.

Figure 3B:
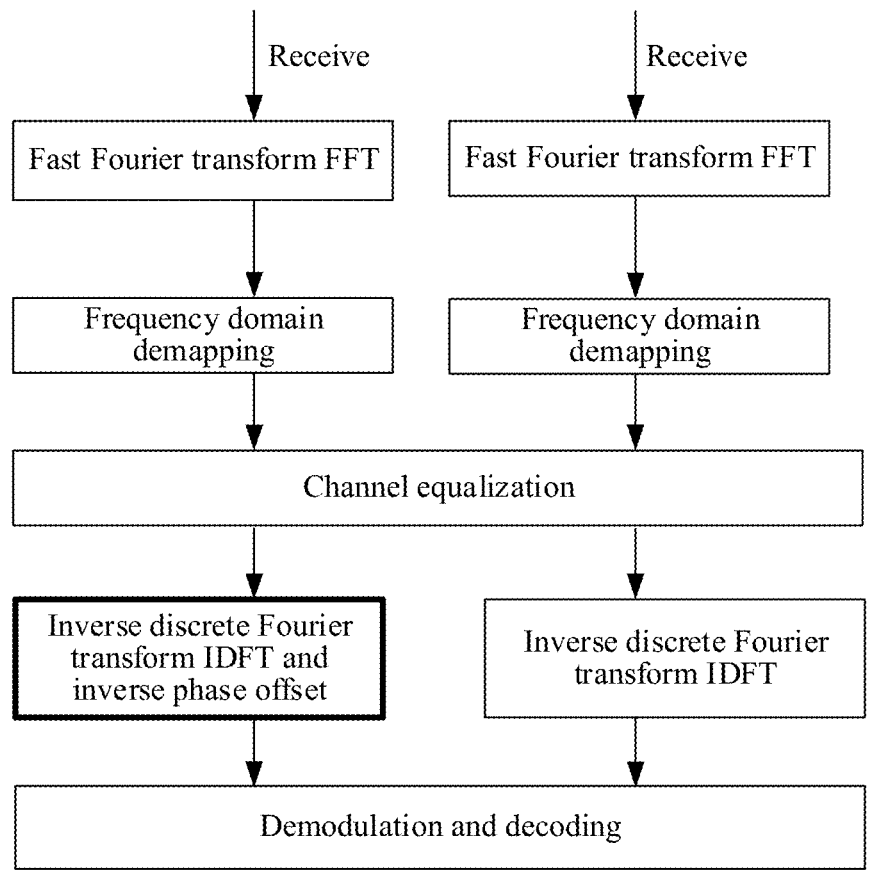
FIG. 3b is a schematic diagram of a signal transmission process applied to a transmitting end according to an embodiment of this application.

FIG. 3a describes a signal transmission process applied to the transmitting end. As shown in FIG. 3b, the following further describes a processing process of the receiving end corresponding to the transmitting end in FIG. 3a. A series of processing is also performed on a signal received by an antenna at a receiving end.

The following processing is performed on signals at a part of layers (the layers may be replaced with streams, antenna ports, or groups): such as, FFT, frequency domain demapping, channel equalization (that is, reducing or even eliminating impact of a spatial channel on a signal), inverse discrete Fourier transform IDFT, demodulation, and channel decoding.

In addition to the foregoing processing, inverse phase offset needs to be performed on signals at another part of layers (the layers may be replaced with streams, antenna ports, or groups). A sequence of the inverse phase offset and the inverse discrete Fourier transform IDFT is not limited.

The receiving end is a reverse process of the transmitting end, and details are not repeated herein.

Figure 4:
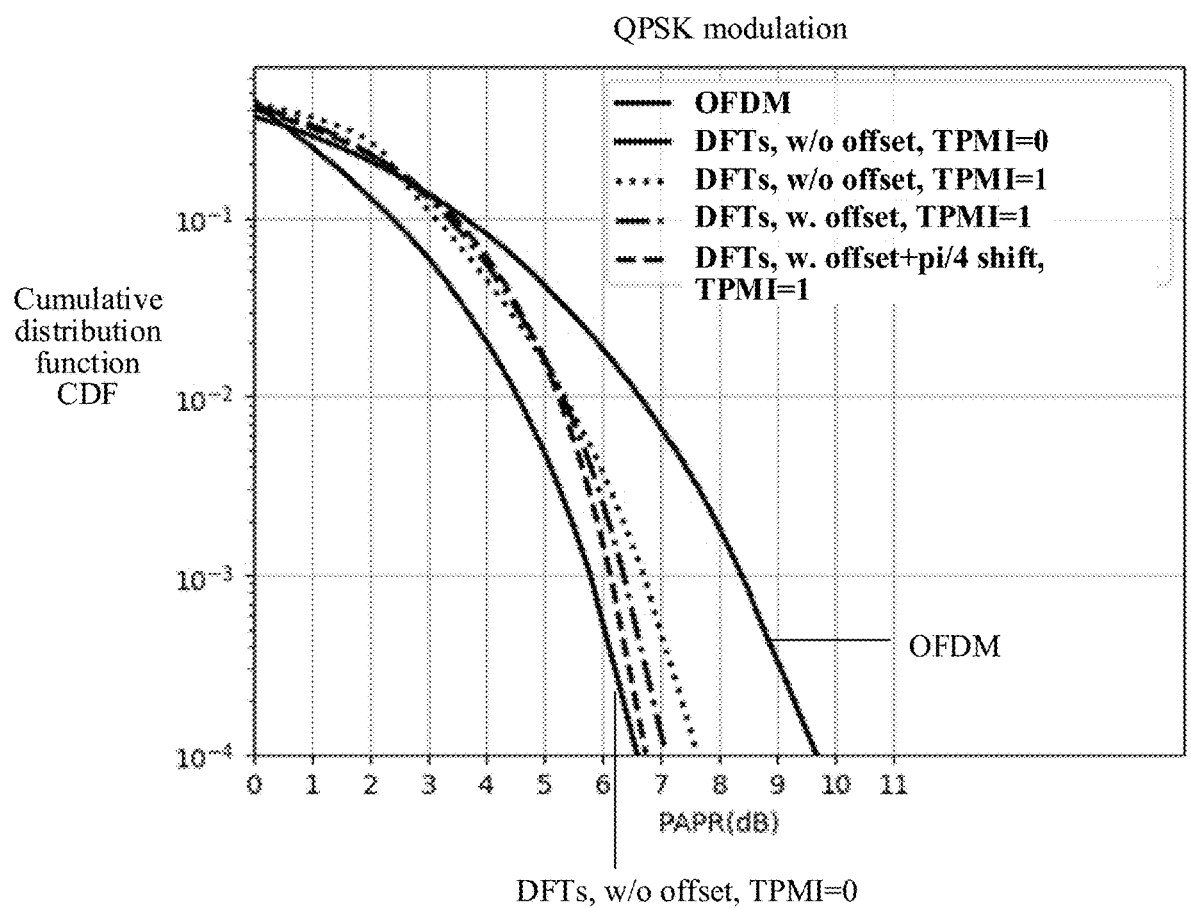
FIG. 4 is a schematic simulation diagram according to an embodiment of this application.

In a simulation diagram shown in FIG. 4, a horizontal coordinate represents a PAPR, and a vertical coordinate represents a cumulative distribution function (CDF). The PAPR of the OFDM waveform transmission signal is close to 9.7 dB. "DFTs, w/o offset, TPMI=0" represents that phase offset is not performed on the DFT-s-OFDM waveform transmission signal, a transmitted precoding matrix indicator is TPMI=0, non-coherent transmission is performed, and the PAPR is close to 6.5 dB. "DFTs, w/o offset, TPMI=1" represents that phase offset is not performed on the DFT-s-OFDM waveform transmission signal, a transmitted precoding matrix indicator is TPMI=1, coherent transmission is performed, and the PAPR is close to 7.6 dB. "DFTs, w. offset, TPMI=1" represents that the DFT-s-OFDM waveform transmission signal is shifted by a first phase, a transmitted precoding matrix indicator is TPMI=1, coherent transmission is performed, and the PAPR is close to 7.1 dB. "DFTs,w. offset+pi/4shift, TPMI=1" represents that the DFT-s-OFDM waveform transmission signal is shifted by a first phase and a second phase, the second phase is $e^{-2\pi m/8}$, a transmitted precoding matrix indicator is TPMI=1, coherent transmission is performed, and the PAPR is close to 6.7 dB. It may be learned that relative to the OFDM waveform transmission signal, the DFT-s-OFDM waveform transmission signal may reduce the PAPR. When the DFT-s-OFDM waveform transmission signal is used, the PAPR may be reduced in a non-coherent transmission manner relative to a coherent transmission manner. When the DFT-s-OFDM waveform transmission signal is used, and the signal is transmitted in a coherent transmission manner, the PAPR may be reduced by performing phase offset.

Figure 5:
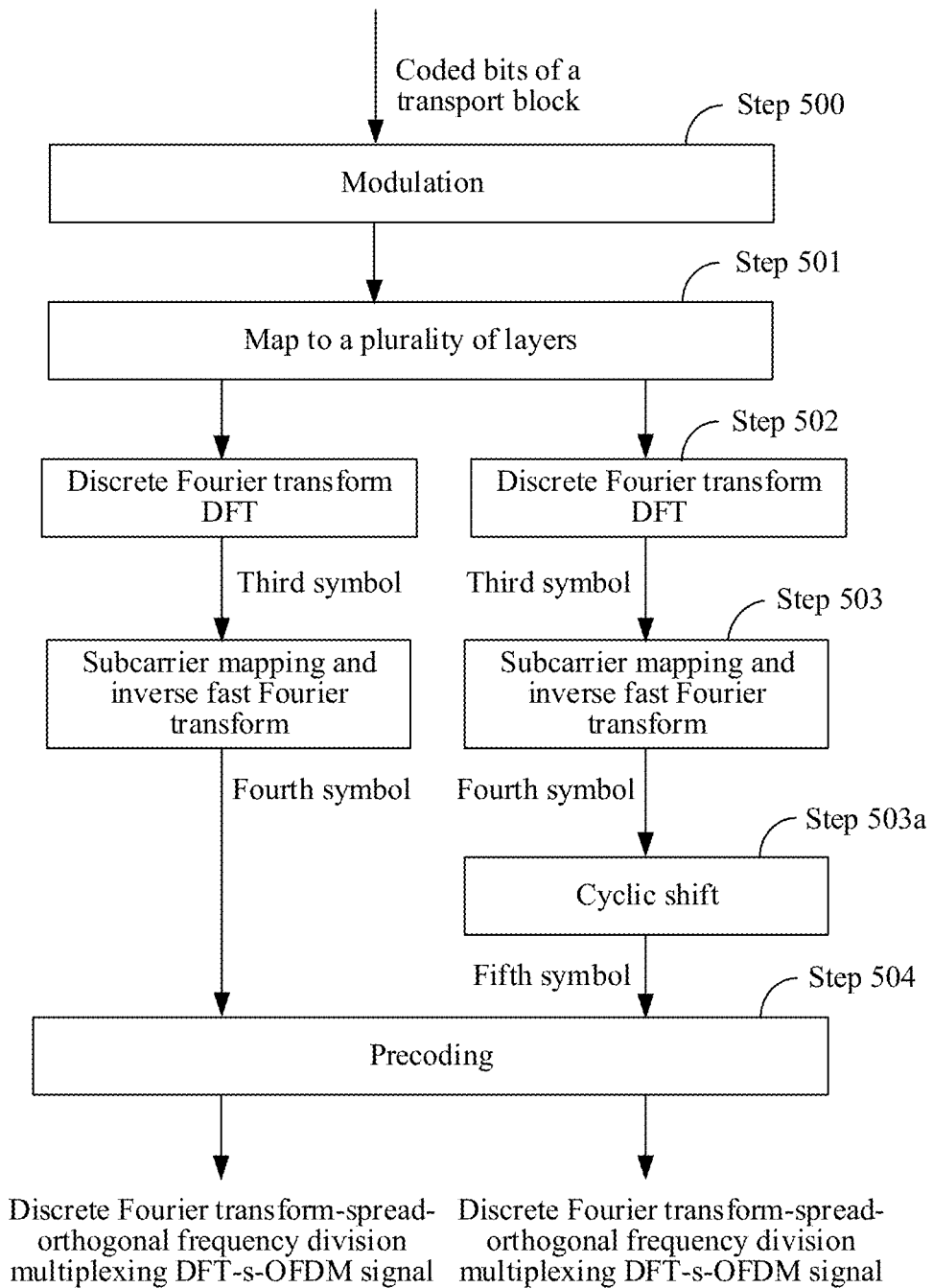
FIG. 5 is a schematic diagram of a signal transmission process applied to a transmitting end according to an embodiment of this application.

As shown in FIG. 5, a schematic diagram of a signal transmission process is further described. In the example in FIG. 3a, phase offset is performed on a symbol, and in the example in FIG. 5, cyclic shift is performed on a symbol. The method in FIG. 5 may be applied to codebook-based transmission, or may be applied to non-codebook-based transmission. The transmitting end in this example may be the network device in FIG. 1, or may be the terminal in FIG. 1.

Step 500. Perform channel coding on a transport block to obtain a plurality of coded bits, and then perform modulation on the plurality of bits to obtain a plurality of modulated symbols, where the modulated symbol may be referred to as modulation symbols, and the modulation symbols may also be referred to as complex-valued symbols. A specific process is the same as a process in step 200, and details are not repeated herein.

Step 501. A transmitting end maps a plurality of modulation symbols to a plurality of layers to obtain a mapped modulation symbol corresponding to each layer. For ease of description below, a part of layers are referred to as a first layer, and another part of layers are referred to as a second layer. A process in step 501 is the same as a process in step 301, and details are not repeated herein.

Step 502. The transmitting end separately performs discrete Fourier transform DFT (that is, transform precoding) on modulation symbols mapped to each layer to obtain a third symbol. The third symbol is a symbol obtained through DFT, and may be referred to as sampling, complex-valued sampling, a complex-valued symbol, or the like. A process in step 502 is the same as the process in step 201 in FIG. 2a, and details are not repeated herein. For example, the third symbol may be represented by Formula 1, Formula 2, or Formula 3 in the embodiment in FIG. 3a.

Step 503. The transmitting end separately performs resource mapping and inverse fast Fourier transform IFFT on the third symbol of each layer to obtain a fourth symbol. The fourth symbol may be referred to as sampling, complex-valued sampling, a complex-valued symbol, or the like.

Step 503a. The transmitting end performs cyclic shift on the fourth symbol at the second layer to obtain a fifth symbol. Cyclic shift is not performed on the fourth symbol at the first layer. A specific process of the cyclic shift is described in detail subsequently. The fourth symbol may be referred to as sampling, complex-valued sampling, a complex-valued symbol, or the like.

Step 504. The transmitting end precodes a fourth symbol at a first layer obtained in step 503 and a fifth symbol at a second layer obtained in step 503a to obtain a DFT-s-OFDM signal. In addition, cyclic prefix CP addition, power adjustment, and transmitting may further be performed on the symbol. A process in step 503 and a process in step 504 are the same as a process in step 202 to a process in step 204 in FIG. 2a, and details are not repeated herein.

In addition, it should be noted that a precoding operation may also be performed before the cyclic shift is performed, or may be performed before resource mapping, inverse fast Fourier transform IFFT, or cyclic prefix CP addition is performed.

The PAPR may be reduced by performing cyclic shift on symbols at a part of layers (the layers may be replaced with antenna ports, streams, or groups).

Similar to the example in FIG. 3a, the layer may be replaced with a stream, an antenna port, or a group.

In an embodiment, "mapping to a plurality of layers" in step 501 may also be replaced with "mapping to a plurality of streams". Correspondingly, "layers" mentioned in step 502, step 503, step 503a, and step 504 may be replaced with "streams", that is, a modulation symbol mapped to each stream is processed.

In an embodiment, "mapping to a plurality of layers" in step 501 may also be replaced with "mapping to a plurality of antenna ports". Correspondingly, "layers" mentioned in step 502, step 503, step 503a, and step 504 may be replaced with "antenna ports", that is, a modulation symbol mapped to each antenna port is processed. The antenna port may be a physical antenna port, or may be a logical antenna port.

In an embodiment, "mapping to a plurality of layers" in step 501 may also be replaced with "mapping to a plurality of groups". Correspondingly, "layers" mentioned in step 502, step 503, step 503a, and step 504 may be replaced with "groups", that is, a modulation symbol mapped to each group is processed.

For example, one group may correspond to one layer, and a plurality of groups correspond to a plurality of layers. The example is equivalent to an example in FIG. 5. For example, one group may correspond to a plurality of layers. For example, two groups correspond to one layer, and three groups correspond to one layer.

For example, a part of groups may correspond to one layer, and another part of groups may correspond to a plurality of layers. For example, a group 1 corresponds to one layer, a group 2 corresponds to two layers, and even one group corresponds to more layers. In the example, when a group performs phase offset as a whole, shifted phases of a plurality of layers corresponding to the group are the same. In an actual application, group-based phase offset helps simplify implementation complexity of a transmitting end or a receiving end. Alternatively, when phase offset is performed on one layer as a whole, shifted phases of a plurality of layers corresponding to the group may be different. The solution is more flexible, so that a performance gain is better.

For example, a plurality of groups may correspond to one layer. For example, a group 1 corresponds to one layer, a group 2 and a group 3 correspond to one layer, and even more groups correspond to one layer. In the example, when a layer performs phase offset as a whole, shifted phases of a plurality of groups corresponding to the layer are the same. In an actual application, group-based phase offset helps simplify implementation complexity of a transmitting end or a receiving end.

A correspondence between a group and an antenna port is similar to a correspondence between a group and a layer, and only "layers" in the foregoing several examples are replaced with "antenna ports", and details are not repeated herein.

A correspondence between a group and a stream is similar to a correspondence between a group and a layer, and only "layers" in the foregoing several examples are replaced with "streams", and details are not repeated herein.

The following describes in detail the "cyclic shift" in step 503*a*.

For each symbol, when cyclic shift is performed on the symbol, the symbol may be a fixed phase.

To improve transmission performance, a value of the cyclic shift is flexibly determined. For example, the value of the cyclic shift is related to a second parameter, and the second parameter includes but is not limited to one or more of the following:

a layer index, an antenna port index, a stream index, a group index, a size of the DFT, a quantity of modulation symbols, a total quantity of layers, a total quantity of antenna ports, a total quantity of streams, a total quantity of groups, a size of IFFT, a quantity of subcarriers, or T=1/Δf, where Δf is a subcarrier spacing.

The following describes the second parameter in detail.

The layer index is an index of a layer to which a symbol is mapped.

The antenna port index is an index of an antenna port to which a symbol is mapped.

The stream index is an index of a stream to which a symbol is mapped.

The group index is an index of a group to which a symbol is mapped. When one group corresponds to one layer, the group index may be considered as the layer index. When one group corresponds to one antenna port, the group index may be considered as the antenna port index. When one group corresponds to one stream, the group index may be considered as the stream index.

The size of the DFT is a size of the DFT corresponding to a layer (the layer may be replaced with an antenna port, a stream, or a group) to which the symbol is mapped. Generally, sizes of the DFT corresponding to different layers (layers may be replaced with antenna ports, streams, or groups) are the same, but may also be different. In step 201 in FIG. 2*a*, a case in which a size of the DFT is related to a scheduled bandwidth is described. For example, the size of the DFT is a quantity of resource elements (RE) scheduled for the terminal, and one RE corresponds to one subcarrier. Generally, a symbol mapped to one layer (the layer may be replaced with an antenna port, a stream, or a group) may be used as a whole to perform the DFT. For example, if 600 modulation symbols are mapped to one layer, a size of the DFT is 600.

The quantity of modulation symbols is a total quantity of modulation symbols included in a layer (the layer may be replaced with an antenna port, a stream, or a group) to which the symbol is mapped. A layer is used as an example for description. For example, in step 301, if there are 1800 modulation symbols, the 1800 modulation symbols are mapped to three layers, and 600 modulation symbols are mapped to one layer, the quantity of modulation symbols is 600.

The size of the IFFT is a size of IFFT corresponding to a layer (the layer may be replaced with an antenna port, a stream, or a group) to which the symbol is mapped. Generally, sizes of the IFFT corresponding to different layers (layers may be replaced with antenna ports, streams, or groups) are the same, but may also be different.

The quantity of subcarriers is a quantity of resource elements REs (that is, a quantity of subcarriers) in the scheduled bandwidth.

It is to be noted that the "layer", "stream", "antenna port", or "group" used in step 501, step 502, step 503, step 503*a*, and step 504 is decoupled from a first parameter referred by the phase offset being a parameter related to the "layer", a parameter related to the "antenna port", a parameter related to the "stream", or a parameter related to the "group". The parameter related to the "layer" is, for example, a layer index and a total quantity of layers; the parameter related to the "antenna port" is, for example, an antenna port index and a total quantity of antenna ports; the parameter related to the "stream" is, for example, a stream index and a total quantity of streams; and the parameter related to the "group" is, for example, a group index and a total quantity of groups. For example, when a plurality of modulation symbols are mapped to a plurality of layers, the second parameter may include a layer index and a total quantity of layers, the second parameter may also include a stream index and a total quantity of layers, and the second parameter may also include an antenna port index and a total quantity of streams.

With reference to the second parameter described above, the following describes in detail several examples of the value of the cyclic shift:

In an example, a first value of the cyclic shift is:

$$\frac{N(m-j)}{RM}, \frac{N(m-j)}{RM}+c,$$

an integer obtained through rounding on $$\frac{N(m-j)}{RM},$$

or an integer obtained through rounding on $$\frac{N(m-j)}{RM}+c,$$

where the rounding is: rounding down, rounding up, or rounding off.

R is a size of the DFT or a quantity of modulation symbols; m is a layer index, an antenna port index, a stream index, or a group index; M is an integer greater than or equal to 2, for example, M is a total quantity of layers, a total quantity of antenna ports, a total quantity of streams, or a total quantity of groups; j is an integer greater than or equal to 0, for example, a minimum value of j is the same as a minimum value of m, and for example, if m starts from 0, j=0, if m starts from 1, j=1, and m usually starts from 0; N is a size of IFFT or a quantity of subcarriers; and c is any value, for example, $$c = k \times \frac{N}{R},$$

where k is an integer, for example, an absolute value of k is equal to or less than N/R.

The foregoing examples are generally applicable to signals over discrete time domain.

In an example, a second value of the cyclic shift is:

$$\frac{T(m-j)}{RM}, \frac{T(m-j)}{RM} + c,$$

an integer obtained through rounding on $$\frac{T(m-j)}{RM},$$

or an integer obtained through rounding on $$\frac{T(m-j)}{RM} + c,$$

where the rounding is: rounding down, rounding up, or rounding off.

R is a size of the DFT or a quantity of modulation symbols; m is a layer index, an antenna port index, a stream index, or a group index; M is an integer greater than or equal to 2, for example, M is a total quantity of layers, a total quantity of antenna ports, a total quantity of streams, or a total quantity of groups; j is an integer greater than or equal to 0, for example, a minimum value of j is the same as a minimum value of m, and for example, if m starts from 0, j=0, if m starts from 1, j=1, and m usually starts from 0; T=1/Δf, and Δf is a subcarrier spacing; and c is any value, for example, $$c = k \times \frac{N}{R},$$

where k is an integer, for example, an absolute value of k is equal to or less than N/R.

The foregoing examples are generally applicable to signals over continuous time domain.

With reference to the foregoing several examples of the first value and the second value of cyclic shift, the following describes in detail several examples of the fifth symbol obtained by performing "cyclic shift".

Before a fifth symbol obtained by performing cyclic shift is described, a fourth symbol obtained by skipping performing cyclic shift is first described.

In an example, $$z_m(p) = \frac{1}{\sqrt{N}} \times \sum_{n=0}^{R-1} y_m(n) e^{\frac{i2\pi}{N} \times (n+n_0) \times p}. \quad \text{(Formula 11)}$$

$z_m(p)$ is a symbol (that is, a fourth symbol) whose index is p at a layer, an antenna port, a stream, or in a group whose index is m; $y_m(n)$ is $y_m(n)$ described in Formula 1, Formula 2, or Formula 3; m starts from 0, and m=0, 1, 2, . . . , and M−1; i=$\sqrt{-1}$; R is a size of DFT or a quantity of modulation symbols; N is a size of IFFT or a quantity of subcarriers; $n_0$ is an index of a start subcarrier scheduled for a terminal; p=0, 1, 2 . . . , N−1; and n is a subcarrier index, and R is a quantity of scheduled frequency domain resources, for example, the size of the DFT is a quantity of resource elements (RE) scheduled for the terminal, and one RE corresponds to one subcarrier.

The foregoing examples are applicable to signals over discrete time domain.

In an example, $$z_m(t) = \frac{1}{\sqrt{N}} \times \sum_{n=0}^{R-1} y_m(n) e^{j2\pi(n+n_0)\Delta f \times t}. \quad \text{(Formula 12)}$$

$z_m(t)$ is a symbol (that is, a fourth symbol) whose index is t at a layer, an antenna port, a stream, or in a group whose index is m (where a symbol may also be referred to as a signal); $y_m(n)$ is $y_m(n)$ described in Formula 1, Formula 2, or Formula 3; m starts from 0, and m=0, 1, 2, . . . , and M−1; i=$\sqrt{-1}$; R is a size of DFT, a quantity of modulation symbols, or a quantity of scheduled frequency domain resources; N is a size of IFFT or a quantity of subcarriers; $n_0$ is an index of a start subcarrier scheduled for a terminal; p=0, 1, 2 . . . , N−1; n is a subcarrier index; and t∈ (−$T_{CP}$,T], where $T_{CP}$ is a cyclic prefix (CP) time, and T=1/Δf, where Δf is a subcarrier spacing.

The foregoing examples are applicable to signals over continuous time domain.

The following describes the fifth symbol obtained by performing cyclic shift. Note: m starts from 0, and j in the first phase and/or the second phase described above is 0.

For example, compared with Formula 11, the fifth symbol obtained by performing cyclic shift Nm/RM is:

$$z_m(p) = \frac{1}{\sqrt{N}} \times \sum_{n=0}^{R-1} y_m(n) e^{\frac{i2\pi}{N} \times (n+n_0) \times \left(p - \frac{Nm}{RM}\right)}. \quad \text{(Formula 13)}$$

For example, compared with Formula 12, the fifth symbol obtained by performing cyclic shift Tm/RM is:

$$z_m(t) = \frac{1}{\sqrt{N}} \times \sum_{n=0}^{R-1} y_m(n) e^{j2\pi(n+n_0)\Delta f \times \left(t - \frac{Tm}{RM}\right)}. \quad \text{(Formula 14)}$$

When cyclic shift is performed on symbols mapped to different layers (the "layers" may be replaced with "antenna ports", "streams", or "groups"), there may be the following cases.

Case 2.1: All second layers are offset by a first value.
Case 2.2: All second layers are offset by a second value.
Case 2.3: A part of second layers are offset by a first value, and another part of second layers are offset by a second value.

With reference to the foregoing three cases of performing cyclic shift, a plurality of first values and second values of cyclic shift, and factors such as values of different second parameters are different, a relatively large quantity of examples of cyclic shift may be obtained with reference to these details, and all the examples fall within a protection scope of this application, and are not listed one by one.

In addition, a value of cyclic shift may be specified in a protocol. To better implement coherent transmission, that is, precoding has a better matching degree on a channel, the transmitting end and the receiving end may also negotiate with each other on a value of cyclic shift. For example, the transmitting end determines the value of the cyclic shift, and notifies the receiving end of the value of the cyclic shift, or notifies the receiving end of a manner of determining the value of the cyclic shift. For another example, the receiving end determines the value of cyclic the shift, and notifies the transmitting end of the value of the cyclic shift, or notifies the transmitting end of a manner of determining the value of the cyclic shift. The transmitting end may be a terminal or a network device, and the receiving end may also be a terminal or a network device.

In addition, the transmitting end (for example, the terminal) may perform cyclic shift only on data, but does not perform cyclic shift on a DMRS. Certainly, the transmitting end (for example, the terminal) may perform cyclic shift on data, or perform cyclic shift on the DMRS. A shifted phase of the DMRS may be the same as or different from a value of cyclic shift of the data.

In the example shown in FIG. 5, based on the cyclic shift, phase offset may be performed on symbols at a part of layers. A process of phase offset is performed after mapping to a plurality of layers in step 502 and before precoding in step 504. The part of layers at which phase offset is performed and the part of layers at which cyclic shift is performed may be same layers or different layers.

For example, after cyclic shift is performed, phase offset is performed on the fifth symbol.

For another example, after mapping to a plurality of layers (the layers may be replaced with antenna ports, streams, or groups) in step 501, and before DFT is performed in step 502, phase offset is performed on a modulation symbol at a part of the layers. Therefore, in step 502, when DFT is performed, DFT is performed on symbols after phase offset is performed at a part of layers and a modulation symbol at a remaining part of the layers.

For another example, after DFT is performed in step 502, and before resource mapping and inverse fast Fourier transform IFFT are performed in step 503, phase offset is performed on third symbols at a part of layers. Therefore, in step 503, when resource mapping and inverse fast Fourier transform IFFT are performed, resource mapping and inverse fast Fourier transform IFFT are performed on symbols after phase offset is performed at a part of layers and third symbols at another remaining part of layers.

In an example, a phase shifted by the phase offset may be a fixed value. In an example, for a phase shifted by the phase offset, refer to the first parameter in the example in FIG. 3a. For example, the shifted phase may be the second phase in the example in FIG. 3a. For details, refer to the foregoing descriptions. Details are not repeated. In this case, the cyclic shift in FIG. 5 may be considered as equivalent to the example of offsetting by a first phase in FIG. 3a.

FIG. 5 describes a signal transmission process applied to the transmitting end. A processing process of the receiving end corresponding to the transmitting end in FIG. 5 may be the same as a processing process of the receiving end described in FIG. 3b, and details are not repeated.

FIG. 3a, FIG. 3b, FIG. 5, and the foregoing described plurality of technical details are combined to describe a plurality of signal transmission methods. In an example, before performing these methods, the transmitting end may first determine whether to perform single-carrier (that is, DFT-s-OFDM) multi-stream coherent transmission. If single-carrier multi-stream coherent transmission is performed, the transmitting end may perform these methods. If single-carrier multi-stream coherent transmission is not performed, the transmitting end may transmit a signal based on a method in the conventional technology.

When the transmitting end is a terminal, the terminal may determine, based on an indication of the network device and/or a precoding matrix, whether to perform single-carrier multi-stream coherent transmission. Alternatively, the terminal determines, based on the determined precoding matrix, whether to perform at least one of the following on data of a part of streams: first phase offset, second phase offset, or first cyclic shift.

In an example, the network device may explicitly indicate whether the terminal performs single-carrier multi-stream coherent transmission. For example, the network device indicates, through 1 bit, whether the terminal performs single-carrier multi-stream coherent transmission. For example, when the 1 bit is 0, it represents that single-carrier multi-stream coherent transmission is performed; and when the 1 bit is 1, it represents that single-carrier multi-stream coherent transmission is not performed.

In an example, the network device may implicitly indicate whether the terminal performs single-carrier multi-stream coherent transmission. For example, the network device indicates a precoding matrix to the terminal, to indicate whether the terminal performs single-carrier multi-stream coherent transmission. In other words, the network device indicates the precoding matrix to the terminal, to indicate whether the terminal performs at least one of the following on data of a part of streams during transmission: first phase offset, second phase offset, or first cyclic shift.

For example, when the precoding matrix indicated by the network device is a non-coherent precoding matrix (for example, a precoding matrix whose index is 0 in Table 1, and precoding matrices whose indexes are 0 to 5 in Table 2), the terminal does not perform single-carrier multi-stream coherent transmission. When the precoding matrix indicated by the network device is a coherent precoding matrix (the coherent precoding matrix may be a complete coherent precoding matrix, or may be a partial coherent precoding matrix and a complete coherent precoding matrix. For example, precoding matrices whose indexes are 1 and 2 in Table 1, and for example, precoding matrices whose indexes are 14 to 21 in Table 2), the terminal performs single-carrier multi-stream coherent transmission.

Figure 6:
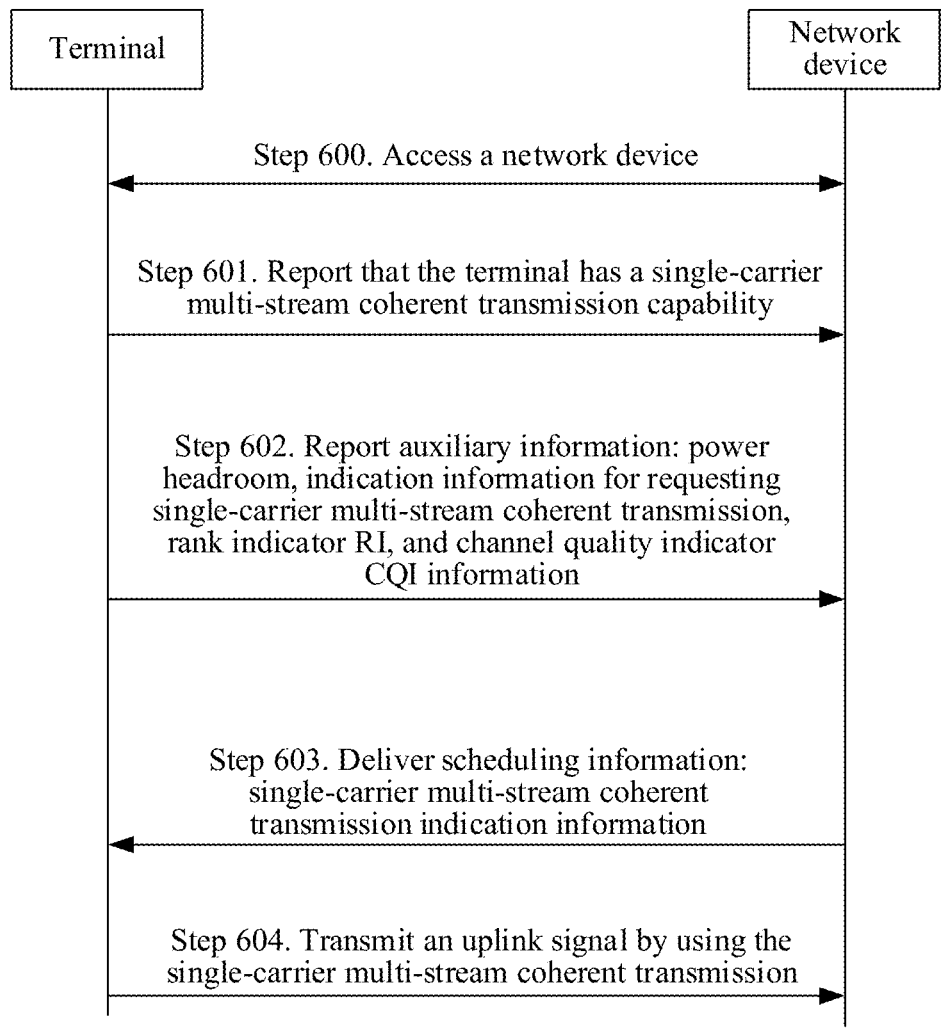
FIG. 6 is a schematic diagram of a process of communication between a terminal and a network device according to an embodiment of this application.

With reference to an example in FIG. 6, the following describes a schematic diagram of a communication process between a terminal and a network device. In the communication process, the terminal may determine whether to perform single-carrier multi-stream coherent transmission.

Step 600. A terminal accesses a network device, and establishes a connection relationship with the network device. For the process, refer to an existing access process. Details are not repeated herein.

Step 601. The terminal reports, to a network device, whether the terminal has a single-carrier multi-stream coherent transmission capability.

The terminal may explicitly indicate, through one field, whether the terminal has the single-carrier multi-stream coherent transmission capability, or the terminal implicitly indicates, through one or more fields, whether the terminal has the single-carrier multi-stream coherent transmission capability. For example, when the terminal has a single-carrier (DFT-s-OFDM) transmission capability, and the terminal supports OFDM uplink multi-stream coherent transmission, the terminal has the single-carrier multi-stream coherent transmission capability by default.

In another implementation, the network device also needs to have the single-carrier multi-stream coherent transmission capability, that is, the network device has a correlation inverse processing capability. The network device may transmit indication information to the terminal, to indicate whether the network device has the single-carrier multi-stream coherent transmission capability. The indication information may be carried in any one or more pieces of signaling such as system information, a radio resource control (RRC) message, a media access control-control (MAC-CE) message, or downlink control information (DCI).

A sequence of notifying the terminal by the network device and notifying the network device by the terminal is not limited.

Generally, when supporting the multi-stream coherent transmission capability, the terminal or the network device definitely indicates the multi-stream non-coherent transmission capability.

Step 602. The terminal may further report some auxiliary information to the network device, so that the network device uses the auxiliary information during scheduling. The auxiliary information may include but is not limited to one or more of the following:

power headroom (PHR), indication information for requesting single-carrier multi-stream coherent transmission, rank indicator (RI) information, or channel quality indicator (CQI) information.

Step 603. The network device generates scheduling information, and delivers the scheduling information to the terminal.

The scheduling information may include but is not limited to one or more of the following:

single-carrier multi-stream coherent transmission indication information, waveform selection (whether transform precoding is performed, that is, DFT-s-OFDM or OFDM), a transmitted precoding matrix indicator (TPMI), a quantity of layers, a modulation coding scheme (MCS), a sounding reference signal resource index (SRI), time resource allocation, frequency domain resource allocation, or the like. The SRI may be applied to uplink non-codebook-based NCB transmission, and the terminal may determine a precoding matrix based on the SRI. The transmitted precoding matrix indicator TPMI may be applied to codebook-based CB transmission, and the terminal may determine a precoding matrix based on the TPMI. The precoding matrix includes a coherent precoding matrix and a non-coherent precoding matrix. The network device implicitly indicates, by indicating the precoding matrix to the terminal, whether the terminal performs single-carrier multi-stream coherent transmission.

The scheduling information in step 603 may be determined by the network device based on information reported in step 601 and/or step 602. For example, if the terminal supports uplink single-carrier multi-stream coherent transmission, the network device may schedule and indicate a precoding matrix for coherent transmission, or schedule and indicate single-carrier multi-stream non-coherent transmission.

For example, if the PHR reported by the terminal is less than a threshold, the network device may indicate uplink single-carrier multi-stream coherent transmission.

Step 604. The terminal transmits an uplink signal based on the scheduling information by using single-carrier multi-stream coherent transmission.

Specifically, an example in FIG. 3a or an example in FIG. 5 may be used to transmit an uplink signal. In other words, the terminal is the transmitting end in the example in FIG. 3a or the example in FIG. 5.

The foregoing describes the method in embodiments of this application, and the following describes an apparatus in embodiments of this application. The method and the apparatus are based on a same technical idea. The method and the apparatus have similar principles for resolving problems.

Therefore, for implementations of the apparatus and the method, refer to each other. Details are not repeated herein.

In embodiments of this application, the apparatus may be divided into function modules based on the foregoing method examples. For example, the apparatus may be divided into function modules corresponding to functions, or two or more functions may be integrated into one module. These modules may be implemented in a form of hardware, or may be implemented in a form of a software functional module. It is to be noted that, in this embodiment of this application, module division is an example, and is merely a logical function division. In a specific implementation, another division manner may be used.

Figure 7:
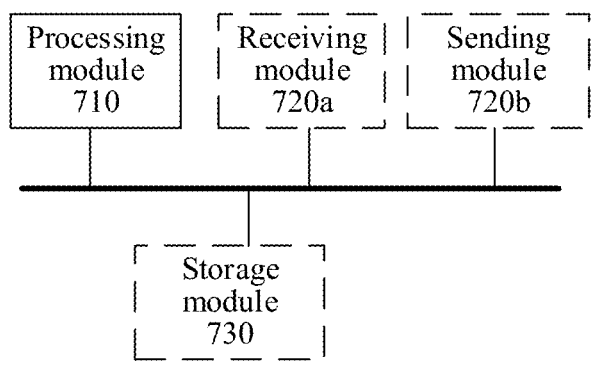
FIG. 7 is a structural diagram of a signal transmission apparatus according to an embodiment of this application.

Based on a same technical concept as the foregoing method, FIG. 7 provides a schematic structural diagram of a signal transmission apparatus 700 (the signal transmission apparatus may also be considered as a communication apparatus). The apparatus 700 may be a transmitting end, or may be a chip or a functional unit used in a transmitting end. The apparatus 700 has any function of the transmitting end in the foregoing methods. For example, the apparatus 700 may perform the steps performed by the transmitting end in the methods in FIG. 2a, FIG. 3a, FIG. 5, and FIG. 6.

The apparatus 700 may include: a processing module 710, and optionally, further include a receiving module 720a, a sending module 720b, and a storage module 730. The processing module 710 may be separately connected to the storage module 730, the receiving module 720a, and the sending module 720b. The storage module 730 may also be connected to the receiving module 720a and the sending module 720b.

The receiving module 720a may perform a receiving action performed by the transmitting end in the foregoing method embodiments.

The sending module 720b may perform a transmit action performed by the transmitting end in the foregoing method embodiments.

The processing module 710 may perform another action other than a transmit action and a receiving action in the actions performed by the transmitting end in the foregoing method embodiments.

In an example, the processing module 710 is configured to map a plurality of modulation symbols to a plurality of layers; perform discrete Fourier transform DFT on a modulation symbol at a part of the layers to obtain a first symbol, and perform discrete Fourier transform DFT and phase offset on a modulation symbol at a remaining part of the layers to obtain a second symbol; and separately perform first processing on the first symbol and the second symbol to obtain a DFT-s-OFDM signal; and the sending module 720b is configured to send the DFT-s-OFDM signal.

A phase shifted by the phase offset is related to a first parameter, where the first parameter includes one or more of the following: a layer index, an antenna port index, a stream index, a symbol index, a subcarrier index, a size of the DFT, a quantity of modulation symbols, a total quantity of layers, a total quantity of antenna ports, a total quantity of streams, a modulation order, or a quantity of modulation constellation symbols. The phase shifted by the phase offset may be the first phase and/or the second phase described above.

In an example, the processing module 710 is configured to map a plurality of modulation symbols to a plurality of layers; perform discrete Fourier transform DFT on a modulation symbol at each layer to obtain a third symbol at each layer; perform frequency domain resource mapping and inverse fast Fourier transform IFFT on the third symbol at each layer to obtain a fourth symbol at each layer; perform cyclic shift on a fourth symbol at a part of the layers to obtain a fifth symbol at each of the part of the layers; and precode the fifth symbol at the part of the layers and the fourth symbol at a remaining part of the layers to obtain a DFT-s-OFDM signal; and the sending module 720*b* is configured to send the DFT-s-OFDM signal.

A value of the cyclic shift is related to a second parameter, and the second parameter includes but is not limited to one or more of the following: a layer index, an antenna port index, a stream index, a size of the DFT, a quantity of modulation symbols, a total quantity of layers, a total quantity of antenna ports, a total quantity of streams, a size of the IFFT, a quantity of subcarriers, or a subcarrier spacing. The value of the cyclic shift may be the first value or the second value described above.

The processing module 710 may be further configured to perform phase offset on a symbol at a part of the layers.

A phase shifted by the phase offset is related to a first parameter, where the first parameter includes one or more of the following: a layer index, an antenna port index, a stream index, a symbol index, a subcarrier index, a size of the DFT, a quantity of modulation symbols, a total quantity of layers, a total quantity of antenna ports, a total quantity of streams, a modulation order, or a quantity of modulation constellation symbols. The phase shifted by the phase offset may be the second phase described above.

In an example, the storage module 730 may store computer-executable instructions of the method performed by the transmitting end, so that the processing module 710, the receiving module 720*a*, and the sending module 720*b* perform the method performed by the transmitting end in the foregoing example.

The receiving module 720*a* and the sending module 720*b* may also be integrated together, and are defined as a transceiver module.

For example, the storage module may include one or more memories. The memory may be one or more devices or components in a circuit that are used to store a program or data. The storage module may be a register, a cache, a RAM, or the like. The storage module may be integrated with the processing module. The storage module may be a ROM or another type of static storage device that can store static information and instructions. The storage module may be independent of the processing module.

The transceiver module may be an input/output interface, a pin, a circuit, or the like.

The foregoing describes the apparatus used on the transmitting end in embodiments of this application, and the following describes a possible product form of the apparatus used on the transmitting end. It can be understood that any form of product that has a feature of the apparatus used on the transmitting end described in FIG. 7 falls within a protection scope of this application. It should be further understood that the following description is only an example, and should not be limited to a product form of the apparatus used on the transmitting end in embodiments of this application.

As a possible product form, the apparatus may be implemented using a general bus architecture.

Figure 8:
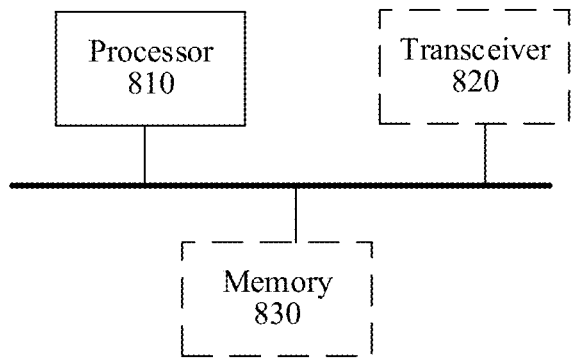
FIG. 8 is a structural diagram of a signal transmission apparatus according to an embodiment of this application.

As shown in FIG. 8, FIG. 8 is a schematic block diagram of a signal transmission apparatus 800 (the signal transmission apparatus may also be considered as a communication apparatus). The apparatus 800 may be a transmitting end, or may be a chip used in a transmitting end. It can be understood that the apparatus has any function of the transmitting end in the foregoing methods. For example, the apparatus 800 may perform the steps performed by the transmitting end in the methods in FIG. 2*a*, FIG. 3*a*, FIG. 5, and FIG. 6.

The apparatus 800 may include a processor 810, and optionally, further include a transceiver 820 and a memory 830. The transceiver 820 may be configured to receive a program or instructions and transmit the program or instructions to the processor 810. Alternatively, the transceiver 820 may be configured to perform communication interaction between the apparatus 800 and another communication device, for example, exchange control signaling and/or service data. The transceiver 820 may be a code and/or data read/write transceiver, or the transceiver 820 may be a signal transmission transceiver between the processor and the transceiver. The processor 810 and the memory 830 are electrically coupled.

For example, the memory 830 is configured to store a computer program. The processor 810 may be configured to invoke the computer program or instructions stored in the memory 830, to perform the method performed by the transmitting end in the foregoing example, or perform, by using the transceiver 820, the method performed by the transmitting end in the foregoing example.

The processing module 710 in FIG. 7 may be implemented by using the processor 810.

The receiving module 720*a* and the sending module 720*b* in FIG. 7 may be implemented by using the transceiver 820. Alternatively, the transceiver 820 includes a receiver and a transmitter. The receiver performs functions of the receiving module, and the transmitter performs functions of the sending module.

The storage module 730 in FIG. 7 may be implemented by using the memory 830.

As a possible product form, the apparatus may be implemented by a general-purpose processor (also referred to as a chip or a chip system).

In a possible implementation, a general-purpose processor that implements the apparatus used on the transmitting end includes: a processing circuit (also referred to as a processor); and optionally, further includes: an input/output interface and a storage medium (also referred to as a memory) that are connected to and communicate with the processing circuit. The storage medium is configured to store instructions executed by the processing circuit, to perform the method executed by the transmitting end in the foregoing example.

The processing module 710 in FIG. 7 may be implemented by using a processing circuit.

The receiving module 720*a* and the sending module 720*b* in FIG. 7 may be implemented by using an input/output interface. Alternatively, the input/output interface includes an input interface and an output interface. The input interface performs functions of the receiving module, and the output interface performs functions of the sending module.

The storage module 730 in FIG. 7 may be implemented by using a storage medium.

As a possible product form, the apparatus in embodiments of this application may be further implemented by using the following: one or more field programmable gate arrays (FPGAs), a programmable logic device (PLD), a controller, a state machine, a gate logic, a discrete hardware component, any other proper circuit, or any combination of circuits that may perform various functions described in this application.

Figure 9:
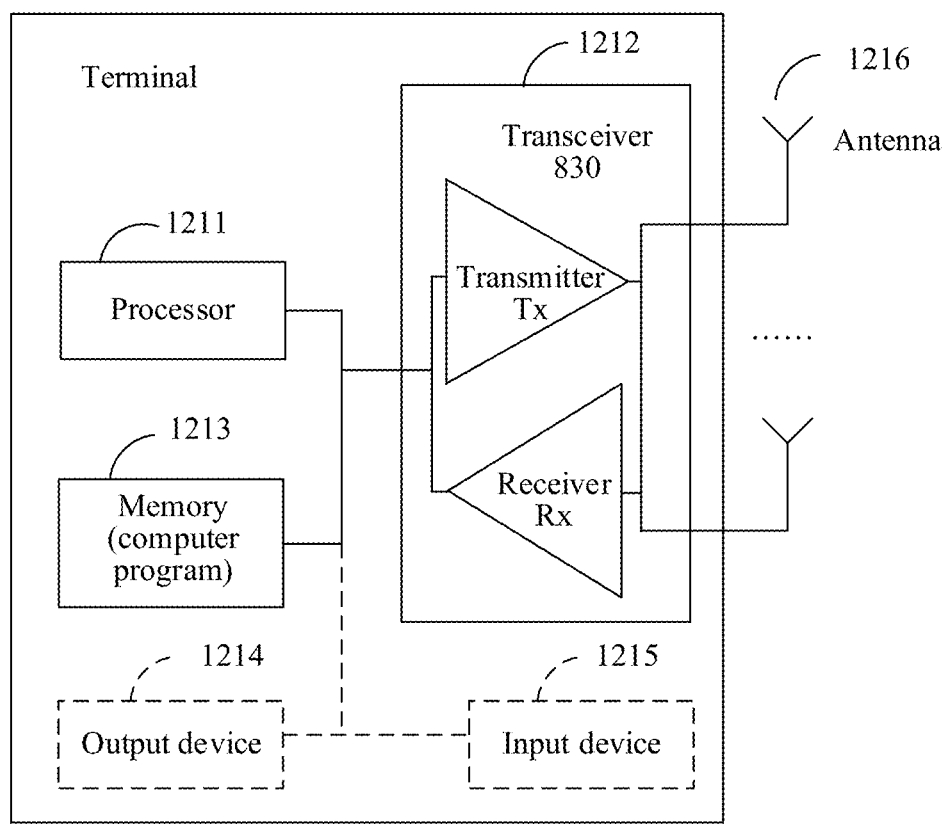
FIG. 9 is a structural diagram of a terminal apparatus according to an embodiment of this application.

FIG. 9 is a schematic diagram of a structure of a terminal according to an embodiment of this application.

The terminal includes: at least one processor 1211 and at least one transceiver 1212. In a possible example, the terminal may further include: at least one memory 1213, an output device 1214, an input device 1215, and one or more antennas 1216. The processor 1211, the memory 1213, and the transceiver 1212 are connected. The antenna 1216 is connected to the transceiver 1212, and the output device 1214 and the input device 1215 are connected to the processor 1211.

The memory 1213 may exist independently, and is connected to the processor 1211. In another example, the memory 1213 may be integrated with the processor 1211, for example, be integrated into a chip. The memory 1213 can store program code for executing the technical solutions in embodiments of this application, and the processor 1211 controls the execution. Various types of executed computer program code may also be considered as drivers of the processor 1211. For example, the processor 1211 is configured to execute the computer program code stored in the memory 1213, to implement the technical solutions in embodiments of this application.

The transceiver 1212 may be configured to support receiving or transmitting of a radio frequency signal between terminals, between a terminal and a network device, or between a terminal and another device. The transceiver 1212 may be connected to the antenna 1216. The transceiver 1212 includes a transmitter Tx and a receiver Rx. Specifically, the one or more antennas 1216 may receive a radio frequency signal. The receiver Rx of the transceiver 1212 is configured to: receive the radio frequency signal from the antenna, convert the radio frequency signal into a digital baseband signal or a digital intermediate frequency signal, and provide the digital baseband signal or the digital intermediate frequency signal for the processor 1211, so that the processor 1211 further processes the digital baseband signal or the digital intermediate frequency signal, for example, performs demodulation processing and decoding processing. In addition, the transmitter Tx of the transceiver 1212 is further configured to: receive a modulated digital baseband signal or a modulated digital intermediate frequency signal from the processor 1211, convert the modulated digital baseband signal or the digital intermediate frequency signal into a radio frequency signal, and transmit the radio frequency signal through the one or more antennas 1216. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

The processor 1211 may be configured to implement various functions for the terminal, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (LCD), a light emitting diode (LED) display device, a cathode ray tube (CRT) display device, a projector (projector), or the like. The input device 1215 communicates with the processor 1211, and may receive user input in a plurality of manners. For example, the input device 1215 may be a mouse, a keyboard, a touchscreen device, or a sensing device.

In addition, a hardware structure of the network device is similar to a hardware structure of the terminal shown in FIG. 9. For example, the network device may include: at least one processor and at least one transceiver. In a possible example, the network device may further include: at least one memory and one or more antennas. In a possible example, the transceiver may include a transmitter Tx and a receiver Rx. The processor, the memory, and the transceiver are connected, and the antenna is connected to the transceiver.

Each component may be configured to implement various functions for the network device. This is similar to that each component is configured to implement various functions for the terminal in FIG. 9. Details are not repeated herein.

Embodiments of this application further provide a computer-readable storage medium, storing a computer program. When the computer program is executed by a computer, the computer may be enabled to perform the signal transmission method. In other words, the computer program includes instructions used to implement the signal transmission method.

Embodiments of this application further provide a computer program product, including computer program code. When the computer program code is run on a computer, the computer is enabled to perform the signal transmission method.

Embodiments of this application further provide a communication system. The communication system includes: a transmitting end and a receiving end that perform the signal transmission method.

In addition, the processor mentioned in embodiments of this application may be a central processing unit (CPU) or a baseband processor. The baseband processor and the CPU may be integrated or separated, or may be a network processor (NP) or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL) and another programmable logic device, a discrete gate or a transistor logic device, a discrete hardware component, or the like, or any combination thereof. The general-purpose processor may be a microprocessor, or the processor may be any conventional processor or the like.

The memory mentioned in embodiments of this application may be a volatile memory or a nonvolatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It is to be noted that the memory described in this application aims to include but is not limited to these memories and any memory of another proper type.

The transceiver mentioned in embodiments of this application may include a separate transmitter and/or a separate receiver, or the transmitter and the receiver may be integrated. The transceiver may operate according to an instruction of a corresponding processor. Optionally, the transmitter may correspond to a transmitter machine in a physical device, and the receiver may correspond to a receiver machine in the physical device.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiment. Details are not described herein again.

In the several embodiments provided in this application, it can be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in embodiments of this application. The foregoing storage medium includes: any medium that can store program code, such as a USB flash drive, a removable hard disk, a read-only memory (ROM), a random access memory (RAM), a magnetic disk, or an optical disc.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

The term "and/or" in this application describes an association relationship for describing associated objects and represents that three relationships may exist. For example, A and/or B may represent the following three cases: Only A exists, both A and B exist, and only B exists. The character "/" generally indicates an "or" relationship between the associated objects. "A plurality of" in this application means two or more. In addition, it can be understood that in description of this application, terms such as "first" and "second" are merely used for distinguishing and description, but should not be understood as indicating or implying relative importance, or should not be understood as indicating or implying a sequence.

This application is described with reference to the flowcharts and/or block diagrams of the method, the device (system), and the computer program product according to embodiments of this application. It can be understood that computer programs or instructions may be used to implement each procedure and/or each block in the flowcharts and/or the block diagrams and a combination of procedures and/or blocks in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some embodiments of this application have been described, a person skilled in the art can make changes and modifications to these embodiments once they learn the basic inventive concept. Therefore, the following claims are intended to be construed as to cover the embodiments and all changes and modifications falling within the scope of this application.

Clearly, a person skilled in the art can make various modifications and variations to embodiments of this application without departing from the scope of embodiments of this application. In this way, this application is intended to cover these modifications and variations to embodiments of this application provided that they fall within the scope of protection defined by the following claims and their equivalent technologies of this application.

What is claimed is:

1. A signal transmission method, wherein the method comprises:
mapping, by a transmitting end, a plurality of modulation symbols to a plurality of layers;
performing, by the transmitting end, a discrete Fourier transform (DFT) on a modulation symbol at a part of the layers to obtain a first symbol, and performing a DFT and phase offset on a modulation symbol at a remaining part of the layers to obtain a second symbol; and
separately performing, by the transmitting end, first processing on the first symbol and the second symbol to obtain a discrete Fourier transform-spread-orthogonal frequency division multiplexing (DFT-s-OFDM) signal, and sending the DFT-s-OFDM signal,
wherein a phase shifted by the phase offset comprises a first phase or a second phase; and
the first phase is:

$$e^{-i2\pi \frac{(m-j)}{RM} \times n},$$

wherein
$i=\sqrt{-1}$, j is an integer greater than or equal to 0, R is a size of the DFT or a quantity of modulation symbols, n is a symbol index or a subcarrier index, m is a layer index, an antenna port index, or a stream index, and M is an integer greater than or equal to 2;
the first phase is:

$$e^{-i2\pi \left(\frac{(m-j)}{RM}+d\right) \times n},$$

wherein
$i=\sqrt{-1}$, j is an integer greater than or equal to 0, R is a size of the DFT or a quantity of modulation symbols, n is a symbol index or a subcarrier index, m is a layer index, an antenna port index, or a stream index, M is an integer greater than or equal to 2, and d is greater than 0; or
the second phase is:

$$e^{-i2\pi \frac{(m-j)}{MQ}},$$

wherein
$i=\sqrt{-1}$, j is an integer greater than or equal to 0, m is a layer index, an antenna port index, or a stream index, M is an integer greater than or equal to 2, and Q is greater than 0.

2. The method according to claim 1, wherein the first processing comprises one or more of the following:
frequency domain resource mapping, inverse fast Fourier transform (IFFT), or precoding.

3. The method according to claim 1, wherein a minimum value of j is the same as a minimum value of m.

4. The method according to claim 1, wherein M is a total quantity of layers, a total quantity of antenna ports, or a total quantity of streams.

5. The method according to claim 1, wherein d=k/R, and k is an integer greater than or equal to 0.

6. The method according to claim 1, wherein Q is related to a modulation order.

7. The method according to claim 1, wherein when the shifted phase is the first phase:

$$e^{-i2\pi \frac{m}{RM} \times n},$$

the second symbol is:

$$y_m(n) = \frac{1}{\sqrt{R}} \times e^{-i2\pi \frac{m}{RM} \times n} \times \sum_{r=0}^{R-1} x_{m,r} e^{-\frac{i2\pi}{R} \times rn};$$

when the shifted phase is the first phase:

$$e^{-i2\pi \left(\frac{m}{RM}+\frac{k}{R}\right) \times n},$$

the second symbol is:

$$y_m(n) = \frac{1}{\sqrt{R}} \times e^{-i2\pi \left(\frac{m}{RM}+\frac{k}{R}\right) \times n} \times \sum_{r=0}^{R-1} x_{m,r} e^{-\frac{i2\pi}{R} \times rn};$$

when the shifted phase is the second phase:

$$e^{-i2\pi \frac{m}{MQ}},$$

the second symbol is:

$$y_m(n) = \frac{1}{\sqrt{R}} \times e^{-i2\pi \frac{m}{MQ}} \times \sum_{r=0}^{R-1} x_{m,r} e^{-\frac{i2\pi}{R} \times rn};$$

when the shifted phase comprises the first phase:

$$e^{-i2\pi \frac{m}{RM} \times n}$$

and the second phase:

$$e^{-i2\pi \frac{m}{MQ}},$$

the second symbol is:

$$y_m(n) = \frac{1}{\sqrt{R}} \times e^{-i2\pi \frac{m}{RM} \times n} \times e^{-i2\pi \frac{m}{MQ}} \times \sum_{r=0}^{R-1} x_{m,r} e^{-\frac{i2\pi}{R} \times rn},$$

wherein
  m is an integer greater than or equal to 0 and less than or equal to M−1; and $x_{m,r}$ is a modulation symbol, r is an index of the modulation symbol, and r is an integer greater than or equal to 0 and less than or equal to R−1.

8. A signal transmission method, wherein the method comprises:
  mapping, by a transmitting end, a plurality of modulation symbols to a plurality of layers;
  performing, by the transmitting end, discrete Fourier transform DFT on a modulation symbol at each layer to obtain a third symbol at each layer;
  performing, by the transmitting end, frequency domain resource mapping and an inverse fast Fourier transform (IFFT) on the third symbol at each layer to obtain a fourth symbol at each layer;
  performing, by the transmitting end, a cyclic shift on a fourth symbol at a part of the layers to obtain a fifth symbol at each of the part of the layers; and
  precoding, by the transmitting end, the fifth symbol at the part of the layers and the fourth symbol at a remaining part of the layers to obtain a discrete Fourier transform-spread-orthogonal frequency division multiplexing (DFT-s-OFDM) signal, and sending the DFT-s-OFDM signal.

9. The method according to claim 8, wherein a value of the cyclic shift is related to a second parameter, and the second parameter comprises but is not limited to one or more of the following:
  a layer index, an antenna port index, a stream index, a size of the DFT, a quantity of modulation symbols, a total quantity of layers, a total quantity of antenna ports, a total quantity of streams, a size of the IFFT, a quantity of subcarriers, or a subcarrier spacing.

10. The method according to claim 8, wherein the value of the cyclic shift is:

$$\frac{N(m-j)}{RM}, \frac{N(m-j)}{RM} + c,$$

an integer obtained through rounding on $$\frac{N(m-j)}{RM},$$

or an integer obtained through rounding on $$\frac{N(m-j)}{RM} + c,$$

wherein the rounding is: rounding down, rounding up, or rounding off, wherein
  R is the size of the DFT or the quantity of modulation symbols; m is the layer index, the antenna port index, or the stream index; M is an integer greater than or equal to 2; j is an integer greater than or equal to 0; N is the size of the IFFT or the quantity of subcarriers; and c is any value; or
  the value of the cyclic shift is:

$$\frac{T(m-j)}{RM}, \frac{T(m-j)}{RM} + c,$$

an integer obtained through rounding on $$\frac{T(m-j)}{RM},$$

or an integer obtained through rounding on $$\frac{T(m-j)}{RM} + c,$$

wherein the rounding is: rounding down, rounding up, or rounding off, wherein
  R is the size of the DFT or the quantity of modulation symbols; m is the layer index, the antenna port index, or the stream index; M is an integer greater than or equal to 2; j is an integer greater than or equal to 0; T=1/Δf, wherein Δf is the subcarrier spacing; and c is any value.

11. The method according to claim 10, wherein $$c = k \times \frac{N}{R}$$

and k is an integer.

12. The method according to claim 10, wherein M is the total quantity of layers, the total quantity of antenna ports, or the total quantity of streams.

13. The method according to claim 10, wherein a minimum value of j is the same as a minimum value of m.

14. The method according to claim 10, wherein when the cyclic shift is Nm/RM, the fifth symbol is:

$$z_m(p) = \frac{1}{\sqrt{N}} \times \sum_{n=0}^{R-1} y_m(n) e^{\frac{i2\pi}{N} \times (n+n_0) \times \left(p - \frac{Nm}{RM}\right)},$$

wherein
  $z_m(p)$ is a fifth symbol whose index is p at a layer whose index is m, at an antenna port whose index is m, or in a stream whose index is m, $y_m(n)$ is a third symbol whose index is n at the layer whose index is m, at the antenna port whose index is m, or in the stream whose index is m, and m is an integer greater than or equal to 0 and less than or equal to M−1; N is the size of the IFFT or the quantity of subcarriers; $n_0$ is an index of a start subcarrier scheduled for a terminal; p=0, 1, 2, . . . , or N−1; and n is a subcarrier index; or when the cyclic shift is: Tm/RM, the fifth symbol is:

$$z_m(t) = \frac{1}{\sqrt{N}} \sum_{n=0}^{R-1} y_m(n) e^{i2\pi(n+n_0)\Delta f \times \left(t - \frac{Tm}{RM}\right)},$$

wherein $z_m(t)$ is a fifth symbol whose index is t at a layer whose index is m, at an antenna port whose index is m, or in a stream whose index is m, $y_m(n)$ is a third symbol whose index is n at the layer whose index is m, at the antenna port whose index is m, or in the stream whose index is m, and m is an integer greater than or equal to 0 and less than or equal to M−1; N is the size of the IFFT or the quantity of subcarriers; $n_0$ is an index of a start subcarrier scheduled for a terminal; p=0, 1, 2, . . . , or N−1; n is a subcarrier index; and t∈(−$T_{CP}$,T], wherein $T_{CP}$ is a cyclic prefix CP time, and T=1/Δf, wherein Δf is the subcarrier spacing.

15. The method according to claim 8, wherein after the mapping, by the transmitting end, the plurality of modulation symbols to the plurality of layers, and before the precoding, by the transmitting end, the fifth symbol at the part of the layers and the fourth symbol at the remaining part of the layers, the method further comprises:

performing a phase offset on a symbol at a part of the layers.

16. The method according to claim 15, wherein a phase shifted by the phase offset is related to a first parameter; and the first parameter comprises one or more of the following:

the layer index, the antenna port index, the stream index, a symbol index, the subcarrier index, the size of the DFT, a quantity of modulation symbols, the total quantity of layers, the total quantity of antenna ports, the total quantity of streams, a modulation order, or a quantity of modulation constellation symbols.

17. The method according to claim 15, wherein a second phase shifted by the phase offset is:

$$e^{-i2\pi \frac{(m-j)}{MQ}},$$

wherein i=$\sqrt{-1}$, j is an integer greater than or equal to 0, m is the layer index, the antenna port index, or the stream index, M is an integer greater than or equal to 2, and Q is greater than 0.

18. A signal transmission apparatus, wherein the apparatus comprises:

a processor, configured to map a plurality of modulation symbols to a plurality of layers; perform a discrete Fourier transform (DFT) on a modulation symbol at a part of the layers to obtain a first symbol, and perform a DFT and phase offset on a modulation symbol at a remaining part of the layers to obtain a second symbol; and separately perform first processing on the first symbol and the second symbol to obtain a discrete Fourier transform-spread-orthogonal frequency division multiplexing (DFT-s-OFDM) signal; and a transmitter, configured to send the DFT-s-OFDM signal, wherein a phase shifted by the phase offset comprises a first phase or a second phase; and the first phase is:

$$e^{-i2\pi \frac{(m-j)}{RM} \times n},$$

wherein i=$\sqrt{-1}$, j is an integer greater than or equal to 0, R is a size of the DFT or a quantity of modulation symbols, n is a symbol index or a subcarrier index, m is a layer index, an antenna port index, or a stream index, and M is an integer greater than or equal to 2;

the first phase is:

$$e^{-i2\pi \left(\frac{(m-j)}{RM} + d\right) \times n},$$

wherein i=$\sqrt{-1}$, j is an integer greater than or equal to 0, R is a size of the DFT or a quantity of modulation symbols, n is a symbol index or a subcarrier index, m is a layer index, an antenna port index, or a stream index, M is an integer greater than or equal to 2, and d is greater than 0; or the second phase is:

$$e^{-i2\pi \frac{(m-j)}{MQ}},$$

wherein i=$\sqrt{-1}$, j is an integer greater than or equal to 0, m is a layer index, an antenna port index, or a stream index, M is an integer greater than or equal to 2, and Q is greater than 0.

19. The signal transmission apparatus according to claim 18, wherein the first processing comprises one or more of the following:

frequency domain resource mapping, inverse fast Fourier transform (IFFT), or precoding.

20. The signal transmission apparatus according to claim 18, wherein M is a total quality of layers, a total quantity of antenna ports, or a total quantity of streams.

* * * * *